US010440586B2

(12) United States Patent
Tsuda

(10) Patent No.: US 10,440,586 B2
(45) Date of Patent: Oct. 8, 2019

(54) APPARATUS FOR FREQUENCY BAND ALLOCATION

(71) Applicant: SONY CORPORATION, Tokyo (JP)

(72) Inventor: Shinichiro Tsuda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 157 days.

(21) Appl. No.: 15/303,666

(22) PCT Filed: Feb. 10, 2015

(86) PCT No.: PCT/JP2015/053703
§ 371 (c)(1),
(2) Date: Oct. 12, 2016

(87) PCT Pub. No.: WO2015/162973
PCT Pub. Date: Oct. 29, 2015

(65) Prior Publication Data
US 2017/0034711 A1 Feb. 2, 2017

(30) Foreign Application Priority Data

Apr. 23, 2014 (JP) ................. 2014-089338

(51) Int. Cl.
H04W 16/16 (2009.01)
H04W 16/04 (2009.01)
(Continued)

(52) U.S. Cl.
CPC .......... H04W 16/16 (2013.01); H04W 16/04 (2013.01); H04W 16/08 (2013.01); H04W 16/14 (2013.01);
(Continued)

(58) Field of Classification Search
CPC ..... H04W 16/02; H04W 16/08; H04W 16/14; H04W 72/048; H04W 72/0453; H04W 28/0226; H04W 52/367; H04W 52/265
See application file for complete search history.

(56) References Cited

U.S. PATENT DOCUMENTS

2006/0153239 A1* 7/2006 Julian ................. H04W 28/065
370/474
2013/0272274 A1* 10/2013 Ishida ................. H04W 72/082
370/336
(Continued)

FOREIGN PATENT DOCUMENTS

CN 103493564 A 1/2014
JP 2012-147256 A 8/2012
(Continued)

OTHER PUBLICATIONS

International Search Report dated Mar. 17, 2015, in PCT/JP2015/053703 filed Feb. 10, 2015.
(Continued)

Primary Examiner — Omer S Mian
(74) Attorney, Agent, or Firm — Xsensus, LLP

(57) ABSTRACT

[Object] To make it possible to prevent a load from being concentrated on a specific node when a frequency band is shared between the cellular system employing the HetNet and other systems.
[Solution] Provided is an apparatus, including: an acquiring unit configured to acquire band-related information that is related to a frequency band available to a macro cell base station of a cellular system among shared bands shared between the cellular system and another system and is provided from a controller for a plurality of macro cell base stations of the cellular system; and a control unit configured to decide a frequency band available to a small cell base (Continued)

station corresponding to the macro cell base station among the frequency bands available to the macro cell base station.

15 Claims, 15 Drawing Sheets

(51) Int. Cl.
   *H04W 16/08* (2009.01)
   *H04W 16/14* (2009.01)
   *H04W 16/32* (2009.01)
   *H04W 52/26* (2009.01)
   *H04W 52/36* (2009.01)
   *H04W 72/04* (2009.01)
   *H04W 72/08* (2009.01)
   *H04W 72/10* (2009.01)
   *H04W 84/04* (2009.01)

(52) U.S. Cl.
   CPC ......... *H04W 16/32* (2013.01); *H04W 52/265* (2013.01); *H04W 52/367* (2013.01); *H04W 72/048* (2013.01); *H04W 72/0453* (2013.01); *H04W 72/0486* (2013.01); *H04W 72/08* (2013.01); *H04W 72/10* (2013.01); *H04W 84/045* (2013.01)

(56) References Cited

U.S. PATENT DOCUMENTS

| | | | |
|---|---|---|---|
| 2014/0050184 A1* | 2/2014 | Yamazaki | H04W 48/02 370/329 |
| 2014/0086208 A1 | 3/2014 | Murray et al. | |
| 2016/0150490 A1* | 5/2016 | Ouchi | H04W 72/12 455/522 |

FOREIGN PATENT DOCUMENTS

| | | |
|---|---|---|
| JP | 2012-175616 A | 9/2012 |
| WO | WO 2012/118740 A1 | 9/2012 |
| WO | WO 2013/161281 A1 | 10/2013 |
| WO | WO 2013/180694 A1 | 12/2013 |

OTHER PUBLICATIONS

"White Space Devices (WSD); Wireless Access Systems operating in the 470 MHz to 790 MHz frequency band; Harmonized EN covering the essential requirements of article 3.2 of the R&TTE Directive", Draft ETSI EN 301 598 v1.0.0, Harmonized European Standard , (Jul. 2013), 71 pages.

Notification of First Office Action dated Jun. 26, 2019, issued in corresponding Chinese Application No. 201580019706.5, 23 pages (with English translation).

\* cited by examiner

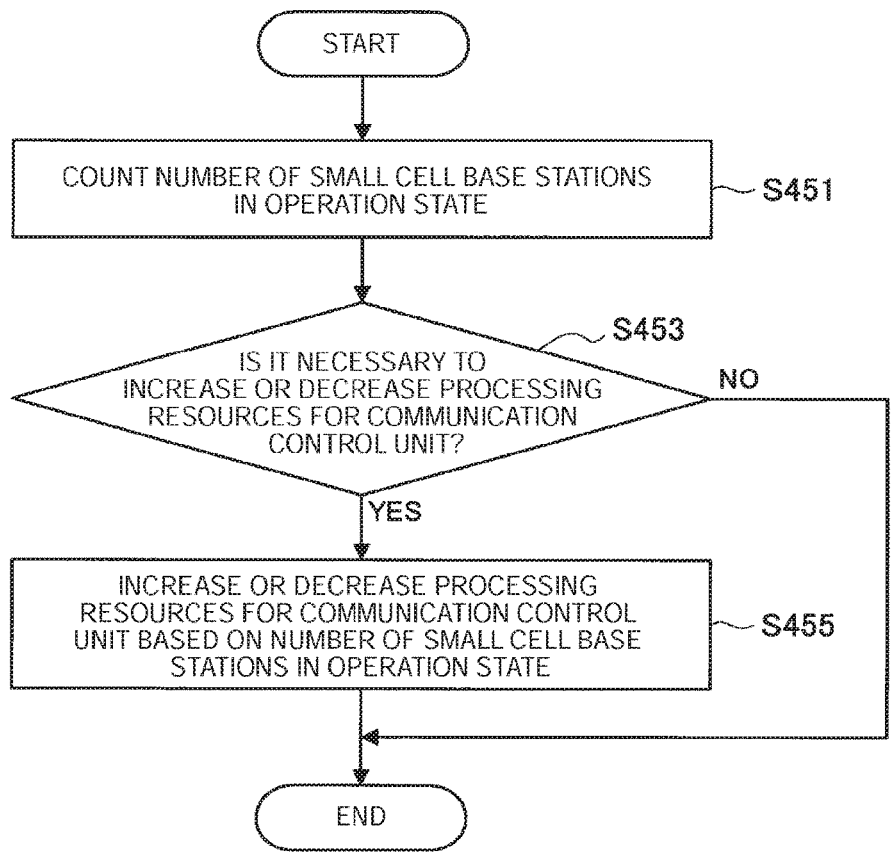
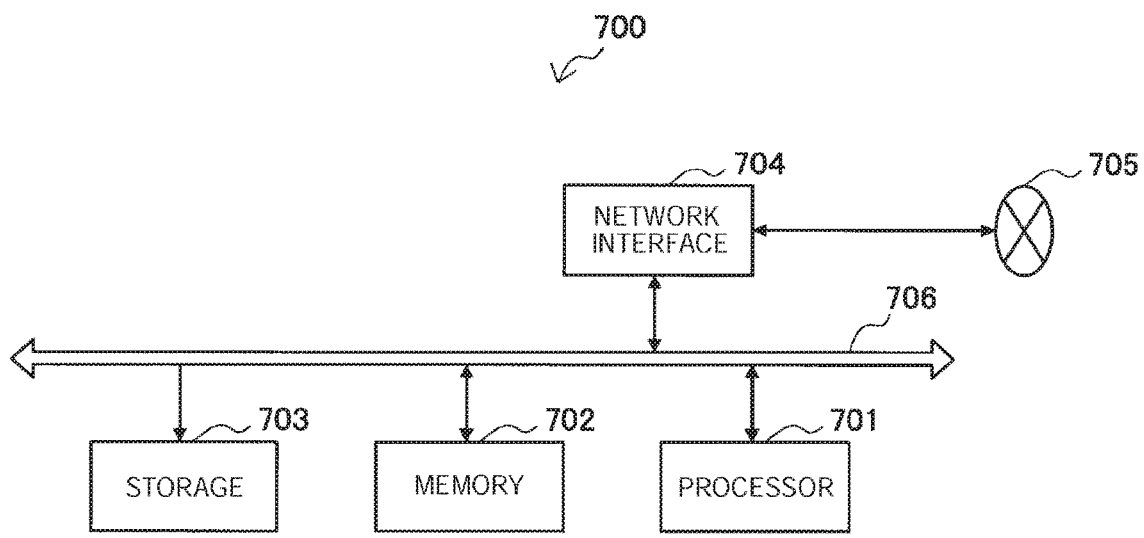

APPARATUS FOR FREQUENCY BAND ALLOCATION

TECHNICAL FIELD

The present disclosure relates to an apparatus.

BACKGROUND ART

In 2002, the mobile phone service of the 3G system called the third generation in Japan started. Initially, small-size packets were transmitted and received for transmission of voice calls and mails. However, with the introduction of high speed downlink packet access (HSDPA), it became possible to transmit and receive larger-size packets for downloading of music files or streaming of video.

With such an increase of packet capacities, the service of long term evolution (LTE) in which orthogonal frequency division multiple access (OFDMA) is used for downlink also started for the expansion on the side of the wireless network. In addition, the start of the 4G service is planned for around 2015. Accordingly, up to 1 Gbps (bit per second) is realized in a semi-fixed state and also up to 100 Mbps is realized even in a moving environment. Also, for example, utilization of small cells is studied to handle hot spots at which traffic locally concentrates or to improve the utilization efficiency of frequency resource. Also, for example, there is an ongoing study on introduction of a frequency sharing technology for sharing frequency band, called white space, which is unused temporally or locally, between systems in accordance with a rule.

For example, a technique of acquiring information related to channels available to a secondary system among frequency channels allocated to a primary system, generating a list of channels recommend for a secondary use node among the channels, and notifying the secondary use node of the list is disclosed in Patent Literature 1. Further, a technique of generating all operational parameters (including a list of frequency blocks permitted for a white space device (WSD) in a television white space database (TVWSDB) and transmitting the operational parameters to the WSD is disclosed in Non-Patent Literature 1 (see page 18).

CITATION LIST

Patent Literature

Patent Literature 1: JP 2012-175616A

Non-Patent Literature

Non-Patent Literature 1: Draft ETSI EN 301 598 V1.0.0 (2013-07) "White Space Devices (WSD); Wireless Access Systems operating in the 470 MHz to 790 MHz frequency band; Harmonized EN covering the essential requirements of article 3.2 of the R&TTE Directive."

SUMMARY OF INVENTION

Technical Problem

However, according to the techniques disclosed in Patent Literature 1 and Non-Patent Literature 1, for example, decision of frequency bands available to individual base stations among frequency bands shared between systems is intensively decided by a specific node, and a load on the specific node is increased. For example, according to the technique disclosed in Patent Literature 1, decision of frequency bands available to individual secondary use nodes (generation of a channel list to be recommend) is intensively performed by a communication control apparatus, and thus a load on the communication control apparatus may be increased. Further, for example, according to the technique disclosed in Non-Patent Literature 1, decision of frequency bands available to master WSDs (generation of a list of frequency blocks to be permitted) is intensively performed by the TVWSDB, and thus a load on the TVWSDB may be increased.

In a cellular system employing a heterogeneous network (HetNet), a small cell base station may be arranged in addition to a macro cell base station. In this case, a burden of deciding frequency bands available to individual base stations (that is, individual macro cell base stations base stations and individual small cell base stations) among frequency bands shared between a cellular system and other systems may be extremely increased in a specific node.

In this regard, it is desirable to provide a mechanism capable of preventing a load from being concentrated on a specific node when a frequency band is shared between the cellular system employing the HetNet and other systems.

Solution to Problem

According to the present disclosure, there is provided an apparatus, including: an acquiring unit configured to acquire band-related information that is related to a frequency band available to a macro cell base station of a cellular system among shared bands shared between the cellular system and another system and is provided from a controller for a plurality of macro cell base stations of the cellular system; and a control unit configured to decide a frequency band available to a small cell base station corresponding to the macro cell base station among the frequency bands available to the macro cell base station.

According to the present disclosure, there is provided an apparatus, including: an acquiring unit configured to acquire band-related information that is related to a frequency band available to a macro cell base station of a cellular system among shared bands shared between wireless communication of the cellular system and other wireless communication and is provided from a controller for a plurality of macro cell base stations of the cellular system; and a control unit configured to control multicasting or broadcasting of the band-related information by the macro cell base station.

According to the present disclosure, there is provided an apparatus, including: an acquiring unit configured to acquire band-related information that is related to a frequency band available to a macro cell base station of a cellular system among shared bands shared between wireless communication of the cellular system and other wireless communication and is provided from a controller for a plurality of macro cell base stations of the cellular system; an estimating unit configured to estimate a frequency band available to a small cell base station corresponding to the macro cell base station among the frequency bands available to the macro cell base station; and a requesting unit configured to request permission for use of the shared band by the small cell base station when there is the frequency band available to the small cell base station.

Advantageous Effects of Invention

As described above, according to the present disclosure, it is possible to prevent a load from being concentrated on a specific node when a frequency band is shared between the cellular system employing the HetNet and other systems. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 11 is a flowchart illustrating an example of a schematic flow of a processing resource control process according to the second embodiment.

FIG. 12 is a block diagram illustrating an example of a schematic configuration of a server.

DESCRIPTION OF EMBODIMENT(S)

Figure 1:
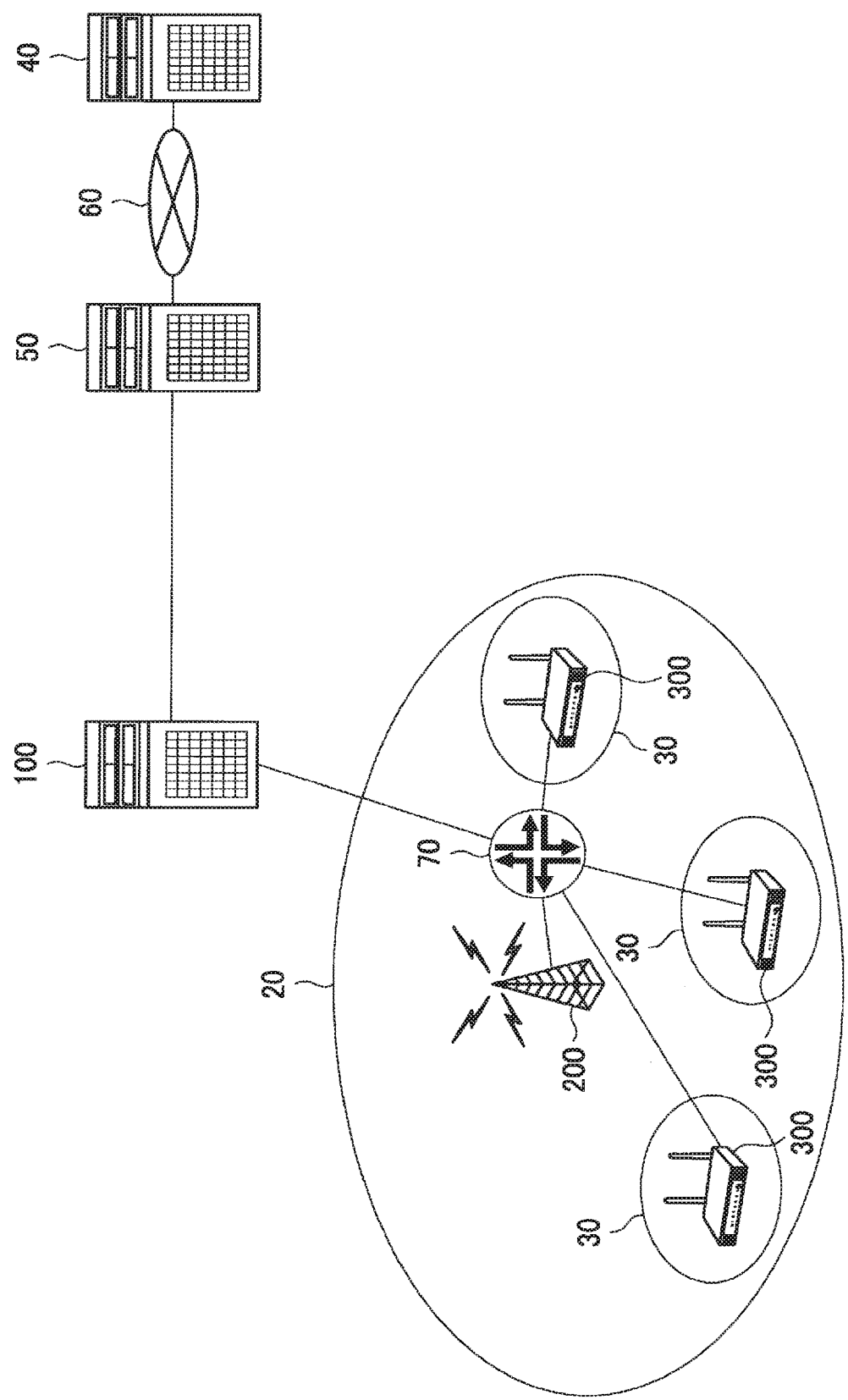
FIG. 1 is an explanatory diagram illustrating an example of a schematic configuration of a communication system according to an embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

In this specification and the drawings, there are cases in which components having substantially the same functional configuration are distinguished by adding different alphabets to the end of the same reference numeral. For example, a plurality of components having substantially the same functional configuration are distinguished like an information processing apparatus 100A, an information processing apparatus 100B, and an information processing apparatus 100C as necessary. However, when a plurality of components having substantially the same functional configuration need not be particularly distinguished, only the same reference numeral is added. For example, when the information processing apparatus 100A, the information processing apparatus 100B, and the information processing apparatus 100C need not be particularly distinguished, they are referred to simply as an "information processing apparatus 100."

The description will proceed in the following order:
1. Schematic configuration of communication system
2. First Embodiment
2.1. Configuration of information processing apparatus
2.2. Configuration of macro cell base station
2.3. Configuration of small cell base station
2.4. Flow of process
2.5. First modified example
2.6. Second modified example
2.7. Third modified example
2.8. Fourth modified example
2.9. Fifth modified example
3. Second Embodiment
3.1. Configuration of information processing apparatus
3.2. Flow of process
4. Application example
4.1. Application examples for information processing apparatus
4.2. Application examples for macro cell base station and small cell base station
4.3. Application examples for small cell base station
5. Conclusion

1. SCHEMATIC CONFIGURATION OF COMMUNICATION SYSTEM

First, a schematic configuration of a communication system 1 according to an embodiment of the present disclosure will be described with reference to FIGS. 1 and 2. FIG. 1 is an explanatory diagram illustrating an example of a schematic configuration of the communication system 1 according to an embodiment of the present disclosure. Referring to FIG. 1, the communication system 1 includes a frequency management system 40, a controller 50, a router 70, an information processing apparatus 100, a macro cell base station 200, and a small cell base station 300.

One macro cell base station 200 corresponding to one controller 50 is illustrated in FIG. 1, but in practice, the communication system 1 includes a plurality of macro cell base stations 200 corresponding to one controller 50. Further, one information processing apparatus 100 corresponding to one controller 50 is illustrated in FIG. 1, but in practice, the communication system 1 includes a plurality of information processing apparatuses 100 corresponding to one controller 50. Furthermore, one macro cell base station 200 corresponds to one information processing apparatus 100, but one information processing apparatus 100 may correspond to one macro cell base station 200 or may correspond to two or more macro cell base stations 200.

(Frequency Management System 40)

The frequency management system 40 manages frequency bands (hereinafter referred to as "shared bands") that are shared between a cellular system and another system. For example, the frequency management system 40 is a system operated by a public institution.

For example, the frequency management system 40 decides a frequency band that is available to the cellular system among the shared bands. More specifically, for example, the frequency management system 40 decides the frequency band available to the cellular system among the shared bands according to a request from the controller 50. Further, for example, the frequency management system 40 decides frequency bands available to the individual macro cell base stations 200 among the shared bands. For example, the frequency management system 40 provides information related to the decided frequency band to the controller 50. For example, when there is no available frequency band, the frequency management system 40 gives, for example, a notification indicating that the request from the controller 50 is declined to the controller 50.

The frequency management system 40 may decide a frequency band available in another system among the shared bands as well.

(Controller 50)

The controller 50 is a node for a plurality of macro cell base stations 200 of the cellular system. For example, the controller 50 is a core network node of the cellular system.

For example, the controller 50 acquires information related to a frequency band available to the macro cell base station 200 among the shared bands in each of a plurality of macro cell base stations 200. More specifically, for example, the controller 50 requests the frequency management system 40 to give permission for the use of the shared band by the macro cell base station 200 according to a request from the information processing apparatus 100. In other words, the controller 50 negotiates with the frequency management system 40 for the permission for the use of the shared band by the macro cell base station 200 according to the request from the information processing apparatus 100. In this case, as described above, the frequency management system 40 decides the frequency band available to the macro cell base station 200, and provides information related to the decided frequency band to the controller 50. Then, the controller 50 acquires the provided information.

For example, the controller 50 provides the acquired information (that is, the information related to the frequency band available to the macro cell base station 200 among the shared bands) to the information processing apparatus 100. The acquired information may be provided to the macro cell base station 200 through the information processing apparatus 100 or may be provided directly to the macro cell base station 200 through the controller 50.

(Information Processing Apparatus 100)

The information processing apparatus 100 is a node for the macro cell base station 200. For example, the information processing apparatus 100 is a core network node of the cellular system.

—Range in which Controller 50 Corresponds to Information Processing Apparatus 100

For example, the controller 50 corresponds to a plurality of macro cell base stations 200, and the information processing apparatus 100 corresponds to one or more of a plurality of macro cell base stations 200. This point will be described below using a specific example with reference to FIG. 2.

Figure 2:
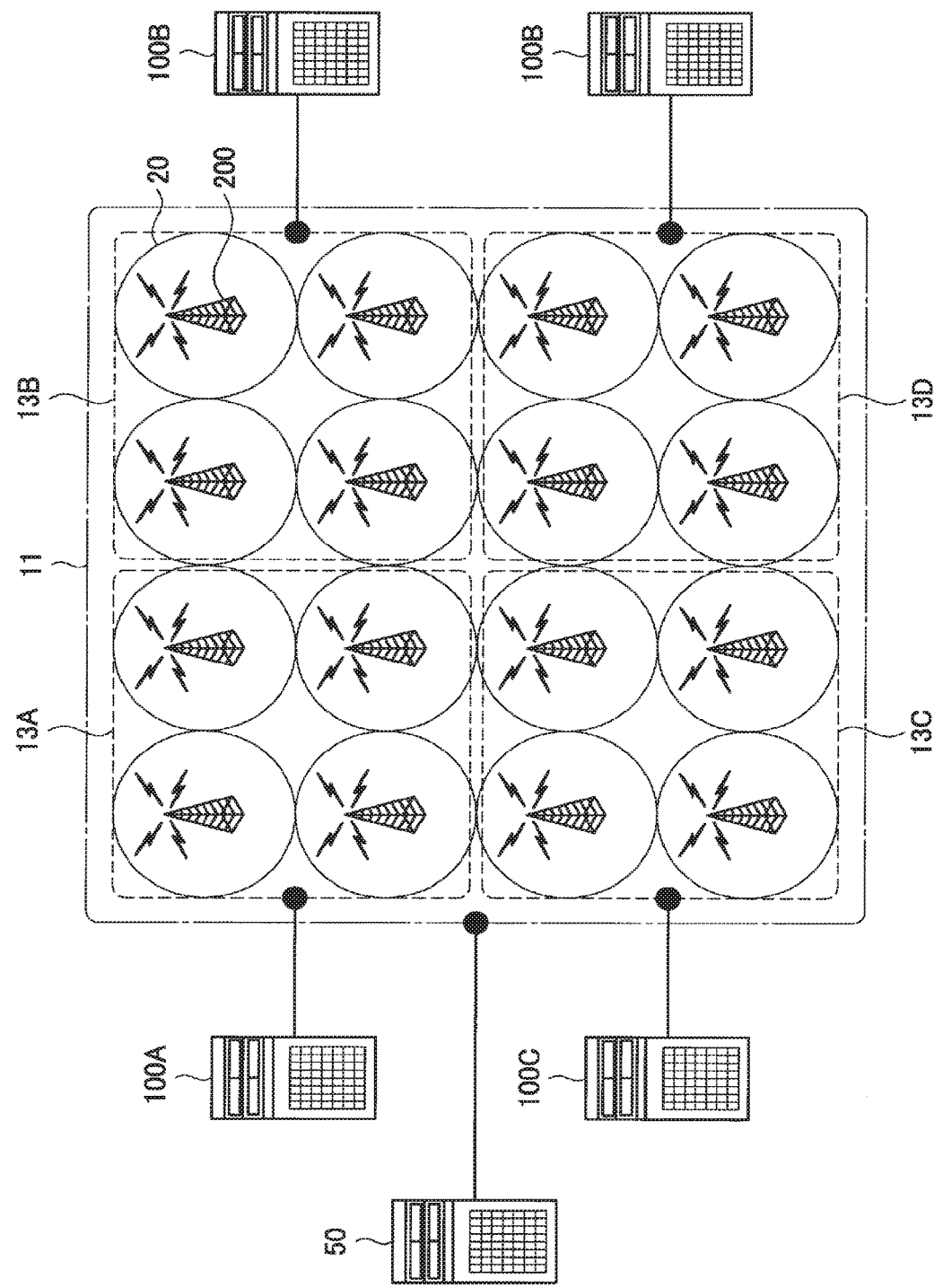
FIG. 2 is an explanatory diagram for describing examples of macro cell base stations corresponding to a controller and an information processing apparatus.

FIG. 2 is an explanatory diagram for describing examples of the macro cell base stations 200 corresponding to the controller 50 and the information processing apparatus 100. Referring to FIG. 2, the controller 50 and four information processing apparatuses 100A, 100B, 100C, and 100D are illustrated. For example, a group 11 of a plurality of macro cell base stations 200 corresponds to the controller 50. Clusters 13A, 13B, 13C, and 13D, each of which is a sub set of the group 11, correspond to the information processing apparatuses 100A, 100B, 100C, and 100D.

The number of macro cell base stations 200 corresponding to the information processing apparatus 100 may be fixedly set. Alternatively, the number of macro cell base stations 200 corresponding to the information processing apparatus 100 may be dynamically changed (for example, through the controller 50) As an example, the number of macro cell base stations 200 corresponding to the information processing apparatus 100 may be changed based on a traffic volume processed in the information processing apparatus 100.

The controller 50 acquires the information related to the frequency band available to the macro cell base station 200 among the shared bands for each of a plurality of macro cell base stations 200 corresponding to the controller 50, and provides the information. The information processing apparatus 100 performs the following operation for the macro cell base station 200 corresponding to the information processing apparatus 100 and the small cell base station 300 (for example, the small cell base station 300 positioned within a macro cell 20 of the macro cell base station 200) corresponding to the macro cell base station 200.

—Operation of Information Processing Apparatus 100

Particularly, in an embodiment of the present disclosure, the information processing apparatus 100 acquires band-related information related to the frequency band available to the macro cell base station 200 (hereinafter referred to as "macro-band-related information") among the shared bands. More specifically, for example, the information processing apparatus 100 requests the controller 50 to give the permission for the use of the shared band by the macro cell base station 200 according to a request from the macro cell base station 200. In this case, as described above, the controller 50 provides the band-related information related to the frequency band available to the macro cell base station 200 (that is, the macro-band-related information) among the shared bands to the information processing apparatus 100. Then, the information processing apparatus 100 acquires the provided band-related information (that is, the macro-band-related information).

Particularly, in an embodiment of the present disclosure, the information processing apparatus 100 decides a frequency band available to the small cell base station 300 corresponding to the macro cell base station 200 among the frequency bands available to the macro cell base station 200. More specifically, for example, the information processing apparatus 100 decides the frequency band available to the small cell base station 300 according to a request from the small cell base station 300.

For example, the information processing apparatus 100 provides other band-related information related to the frequency band available to the small cell base station 300 (hereinafter referred to as "small-band-related information") to the small cell base station 300.

For example, the information processing apparatus 100 provides the band-related information related to the frequency band available to the macro cell base station 200 (that is, the macro-band-related information) to the macro cell base station 200.

(Macro Cell Base Station 200)

The macro cell base station 200 is a base station of the cellular system. For example, the macro cell base station 200 corresponds to one information processing apparatus 100 and corresponds to one controller. The information processing apparatus 100 corresponding to the macro cell base station 200 may be fixedly set or may be dynamically set (for example, through the controller 50).

The macro cell base station 200 performs wireless communication with a terminal apparatus that is positioned in the macro cell 20. For example, the macro cell base station 200 transmits a downlink signal to the terminal apparatus and receives an uplink signal from the terminal apparatus.

The macro cell base station 200 performs wireless communication using a frequency band for the cellular system (hereinafter referred to as a "cellular band"). Particularly, in an embodiment of the present disclosure, the macro cell base station 200 performs wireless communication using the frequency band available to the macro cell base station 200 among the shared bands.

For example, the macro cell base station 200 requests the information processing apparatus 100 to give the permission for the use of the shared band by the macro cell base station 200. In this case, the band-related information related to the frequency band available to the macro cell base station 200 (that is, the macro-band-related information) among the shared bands is provided to the macro cell base station 200 through the information processing apparatus 100 (or the controller 50). Then, the macro cell base station 200 acquires the band-related information (that is, the macro-band-related information).

(Small Cell Base Station 300)

The small cell base station 300 is a base station for the cellular system. For example, the small cell base station 300 corresponds to one macro cell base station 200. Specifically, for example, one macro cell base station 200 is a base station of the macro cell 20 in which the small cell base station 300 is positioned. Alternatively, one macro cell base station 200 may be the macro cell base station 200 closest to the small cell base station 300 among the macro cell base stations 200. For example, the small cell base station 300 corresponds to one information processing apparatus corresponding to one macro cell base station 200.

The small cell base station 300 performs wireless communication with the terminal apparatus positioned in a small cell 30. For example, the small cell base station 300 transmits the downlink signal to the terminal apparatus, and receives the uplink signal from the terminal apparatus. The small cell base station 300 may receive the downlink signal transmitted from the macro cell base station 200.

The small cell base station 300 performs wireless communication using the frequency band for the cellular system (that is, the cellular band). Particularly, in an embodiment of the present disclosure, the small cell base station 300 performs wireless communication using the frequency band available to the small cell base station 300 among the frequency bands available to the macro cell base station 200 among the shared bands.

For example, the small cell base station 300 requests the information processing apparatus 100 to give the permission for the use of the shared band by the small cell base station 300. In this case, the band-related information related to the frequency band available to the small cell base station 300 (that is, the small-band-related information) among the frequency bands available to the macro cell base station 200 among the shared bands is provided from the information processing apparatus 100 to the small cell base station 300. Then, the small cell base station 300 acquires the band-related information (that is, the small-band-related information).

Transmission power of the small cell base station 300 is lower than transmission power of the macro cell base station 200. Thus, the small cell 30 of the small cell base station 300 is smaller than the macro cell 20 of the macro cell base station 200.

The small cell base station 300 may be a mobile apparatus that can operate as a base station. As an example, the small cell base station 300 may be a mobile router. In this case, the information processing apparatus 100 may perform communication with the small cell base station 300 (the mobile apparatus that can operate as a base station) through the macro cell base station 200.

(Router 70)

The router 70 transfers information. For example, the router 70 transfers information from a core network to the macro cell base station 200 or the small cell base station 300. The router 70 transfers data from the macro cell base station 200 or the small cell base station 300 to the core network. The router 70 may transfer information based on control by the information processing apparatus 100. The router 70 may transfer information based on control by the controller 50.

The router 70 may be a mobile router. The router 70 may be mounted in an apparatus called a serving gateway (S-GW) of the core network.

2. FIRST EMBODIMENT

Next, a first embodiment of the present disclosure will be described with reference to FIGS. 3 to 9.

2.1. Configuration of Information Processing Apparatus

Figure 3:
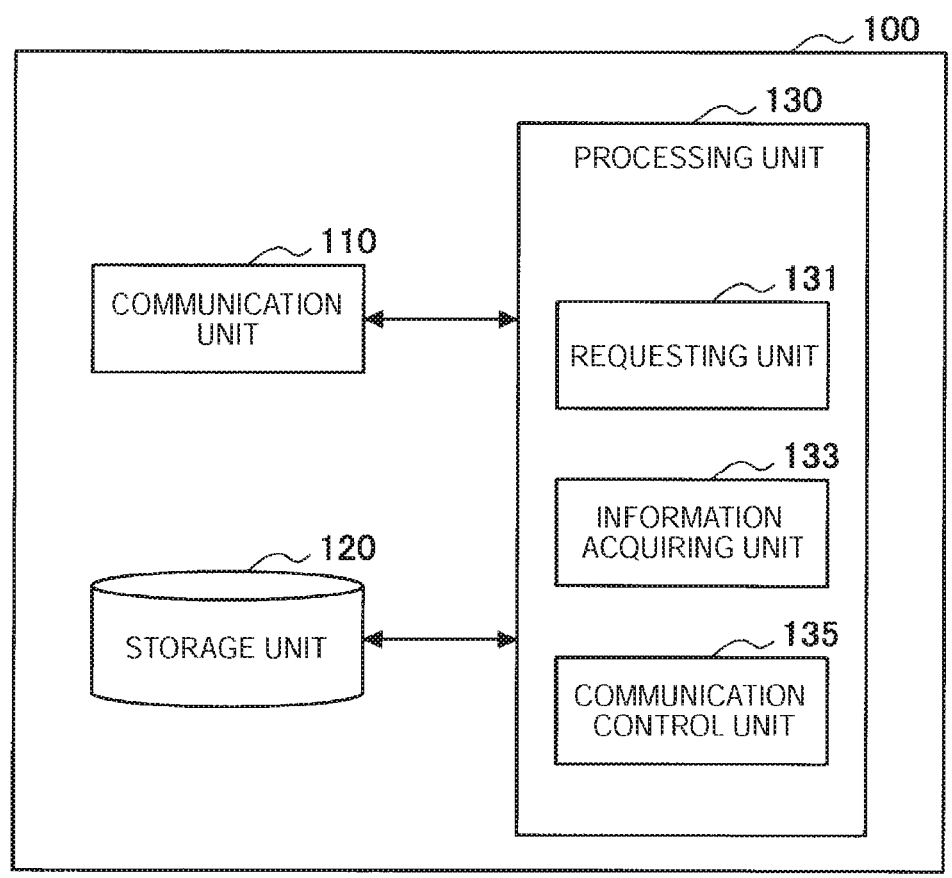
FIG. 3 is a block diagram illustrating an example of a configuration of an information processing apparatus according to a first embodiment.

First, an example of a configuration of the information processing apparatus 100 according to the first embodiment will be described with reference to FIGS. 3 to 5. FIG. 3 is a block diagram illustrating an example of a configuration of the information processing apparatus 100 according to the first embodiment. Referring to FIG. 3, the information processing apparatus 100 includes a communication unit 110, a storage unit 120, and a processing unit 130.

(Communication Unit 110)

The communication unit 110 performs communication with another node. For example, the communication unit 110 performs communication with the macro cell base station 200 and the small cell base station 300. For example, the communication unit 110 performs communication with the controller 50.

(Storage Unit 120)

The storage unit 120 temporarily or permanently stores a program and data for an operation of the information processing apparatus 100.

(Processing Unit 130)

The processing unit 130 provides various functions of the information processing apparatus 100. The processing unit 130 includes a requesting unit 131, an information acquiring unit 133, and a communication control unit 135. The processing unit 130 may further include any other component in addition to the above-mentioned components. In other words, the processing unit 130 may also perform an operation other than operations of the above-mentioned components.

(Requesting Unit 131)

The requesting unit 131 requests the controller 50 to give the permission for the use of the shared band (that is, the frequency band shared between the cellular system and another system) by the macro cell base station 200.

(a) Trigger of Request

For example, the requesting unit 131 requests the controller 50 to give the permission for the use of the shared band by the macro cell base station 200 according to the request from the macro cell base station 200.

(b) Specific Process

For example, the requesting unit 131 transmits a permission-to-use request message requesting the permission for the use of the shared band by the macro cell base station 200 through the communication unit 110 through the controller 50.

(c) Provision of Information (c-1) Provision of Position Information

For example, the requesting unit 131 provides position information indicating the position of the macro cell base station 200 to the controller 50.

Acquisition of Position Information

For example, when a request is transmitted to the information processing apparatus 100, the macro cell base station 200 provides the position information to the information processing apparatus 100, and the requesting unit 131 acquires the position information.

The position information may not be provided from the macro cell base station 200 to the information processing apparatus 100 with each request. As an example, the position information may be provided from the macro cell base station 200 to the information processing apparatus 100 at regular intervals or according to the occurrence of any event. As another example, the position information may be provided from any other node to the information processing apparatus 100. Further, as another example, the position information may be stored in the storage unit 120 in advance.

—Provision Timing

For example, the requesting unit 131 provides the position information to the controller 50 when requesting the controller 50 to give the permission for the use of the shared band by the macro cell base station 200. More specifically, for example, the requesting unit 131 transmits the permission-to-use request message including the position information through the controller 50.

For example, as described above, the position information indicating the position of the macro cell base station 200 is provided to the controller 50. As a result, for example, it is possible to decide the frequency bands available to the individual macro cell base stations 200.

(c-2) Provision of Other Information

The requesting unit 131 may provide other information to the controller 50.

(Information Acquiring Unit 133)

(a) Acquisition of Macro-Band-Related Information

The information acquiring unit 133 acquires the band-related information related to the frequency band available to the macro cell base station (hereinafter referred to as a "macro band") 200 among the shared bands (that is, the macro-band-related information). The macro-band-related information is provided through the controller 50.

(a-1) Specific Process

For example, as described above, the requesting unit 131 requests the controller 50 to give the permission for the use of the shared band by the macro cell base station 200. In this case, the controller 50 requests the frequency management system 40 to give the permission for the use of the shared band by the macro cell base station 200. Then, the frequency management system 40 decides the frequency band available to the macro cell base station 200 (that is, the macro band) among the shared bands. Thereafter, the macro-band-related information indicating the macro band is provided from the frequency management system 40 to the controller 50, then provided from the controller 50 to the information processing apparatus 100, and then stored in the storage unit 120. At any of subsequent timings, the information acquiring unit 133 acquires the macro-band-related information from the storage unit 120.

For example, as described above, the band-related information is information provided by the controller 50 according to the request for the permission for the use of the shared band by the macro cell base station 200.

(a-2) Macro Band

For example, the macro band is a band decided based on the position of the macro cell base station 200.

Specifically, for example, as described above, the requesting unit 131 provides the position information indicating the position of the macro cell base station 200 to the controller 50 when requesting the controller 50 to give the permission for the use of the shared band by the macro cell base station 200. The controller 50 provides the position information indicating the position of the macro cell base station 200 to the frequency management system 40 when requesting the frequency management system 40 to give the permission for the use of the shared band by the macro cell base station 200. Then, the frequency management system 40 decides the frequency band available to the macro cell base station 200 (that is, the macro band) among the shared bands based on the position of the macro cell base station 200. As described above, the macro band is a band decided based on the position of the macro cell base station 200.

For example, the macro band includes one or more individual bands. In other words, the macro band may be one band or may include two or more individual bands.

(a-3) Macro-Band-Related Information

—Macro Band

For example, the macro-band-related information includes information indicating the macro band (that is, the frequency band available to the macro cell base station 200 among the shared bands).

—Maximum Transmission Power

For example, the macro-band-related information includes information indicating the maximum transmission power when the macro cell base station 200 uses the macro band. As a result, for example, it is possible to specify a region in which a signal can be transmitted using the macro band.

As described above, the macro band may include two or more individual bands. In this case, the macro-band-related information may include the information indicating the maximum transmission power of each individual band.

—Available Period

The band-related information includes information indicating an available period of the macro band. As a result, for example, it is possible to prevent the macro band from being used in a non-available period.

As described above, the macro band may include two or more individual bands. In this case, the macro-band-related information may include information indicating an available period of each individual band.

(a-4) Case in which Macro-Band-Related Information is Acquired

For example, when the use of the shared band by the macro cell base station 200 is permitted, the information acquiring unit 133 acquires the macro-band-related information.

Specifically, for example, when the frequency management system 40 decides the macro band including any one of the shared bands, the macro-band-related information is provided from the frequency management system 40 to the controller 50. Then, the macro-band-related information is provided from the controller 50 to the information processing apparatus 100, and the information acquiring unit 133 acquires the macro-band-related information.

On the other hand, for example, when the use of the shared band by the macro cell base station 200 is not permitted, the information acquiring unit 133 does not acquire the macro-band-related information.

Specifically, for example, when there is no band available to the macro cell base station 200 among the shared bands, the frequency management system 40 neither decides the macro band nor provides the macro-band-related information to the controller 50. For this reason, the information acquiring unit 133 does not acquire the macro-band-related information.

As described above, the information acquiring unit 133 acquires the macro-band-related information. The information processing apparatus 100 may correspond to two or more macro cell base stations 200. Thus, the information acquiring unit 133 can acquire the band-related information that is the band-related information related to the frequency band available to the macro cell base station among the shared bands and is provided from the controller 50 for each of the two or more macro cell base stations 200 (that is, the macro-band-related information).

(b) Acquisition of Prohibition Period Information

For example, the information acquiring unit 133 acquires prohibition period information indicating a period in which the request for the permission for the use of the shared band by the macro cell base station 200 is prohibited. The prohibition period information is provided from the controller 50.

For example, the information acquiring unit 133 acquires the prohibition period information when the use of the shared band by the macro cell base station 200 is not permitted.

Specifically, for example, when there is no band available to the macro cell base station 200 among the shared bands, the frequency management system 40 does not decide the macro band. In this case, the frequency management system 40 provides the prohibition period information to the controller 50, and the controller 50 provides the prohibition period information to the information processing apparatus 100. Then, the information acquiring unit 133 acquires the prohibition period information.

As a result, for example, when the shared band is unavailable, it is possible to prevent the permission for the use of the shared band from being requested. As a result, the load on the frequency management system 40 and the controller 50 can be reduced.

(c) Acquisition of Position Information

—Position information of small cell base station 300

For example, the information acquiring unit 133 acquires position information indicating the position of the small cell base station 300.

For example, the small cell base station 300 requests the information processing apparatus 100 to give the permission for the use of the shared band by the small cell base station 300. The small cell base station 300 provides the position information indicating the position of the small cell base station 300 to the information processing apparatus 100 when requesting the permission for the use. Then, the position information is stored in the storage unit 120. At any one of subsequent timings, the information acquiring unit 133 acquires the position information.

As described above, the position information may not be provided from the small cell base station 300 to the information processing apparatus 100 with each request. As an example, the position information may be provided from the small cell base station 300 to the information processing apparatus 100 at regular intervals or according to the occurrence of any event. As another example, the position information may be provided from any other node to the information processing apparatus 100. Further, as another example, the position information may be stored in the storage unit 120 in advance.

—Position Information of Macro Cell Base Station 200

For example, the information acquiring unit 133 acquires the position information indicating the position of the macro cell base station 200.

For example, as described above, the macro cell base station 200 provides the position information indicating the position of the macro cell base station 200 to the information processing apparatus 100 when requesting the information processing apparatus 100 to give the permission for the use of the shared band by the macro cell base station 200. Then, the position information is stored in the storage unit 120. At any one of subsequent timings, the information acquiring unit 133 acquires the position information.

As described above, the position information may not be provided from the macro cell base station 200 to the information processing apparatus 100 with each request. As an example, the position information may be provided from the macro cell base station 200 to the information processing apparatus 100 at regular intervals or according to the occurrence of any event. As another example, the position information may be provided from any other node to the information processing apparatus 100. Further, as another example, the position information may be stored in the storage unit 120 in advance.

(Communication Control Unit 135)

(a) Decision of Small Band

The communication control unit 135 decides the frequency band available to the small cell base station 300 corresponding to the macro cell base station 200 among the frequency bands available to the macro cell base station 200 (that is, the macro bands) among the shared bands (hereinafter referred to as a "small band").

(a-1) Trigger of Decision

For example, the communication control unit 135 decides the small band according to the request from the small cell base station 300.

For example, the small cell base station 300 requests the information processing apparatus 100 to give the permission for the use of the shared band by the small cell base station 300. The communication control unit 135 decides the frequency band available to the small cell base station 300 (that is, the small band) among the macro bands of the macro cell base station 200 corresponding to the small cell base station 300 according to the request.

As a result, for example, the small cell base station 300 can use the shared band as necessary.

(a-2) Decision Technique

—Decision Based on Position

For example, the communication control unit 135 decides the small band based on the position of the small cell base station 300. The position of the small cell base station 300 is indicated by the position information of the small cell base station 300 acquired by the information acquiring unit 133.

For example, the communication control unit 135 decides the small band based on the position of the macro cell base station 200. The position of the macro cell base station 200 is indicated by the position information of the macro cell base station 200 acquired by the information acquiring unit 133.

—Decision Based on Maximum Transmission Power of Macro Cell Base Station

For example, the communication control unit 135 decides the small band based on the maximum transmission power when the macro cell base station 200 uses the macro band. The maximum transmission power is indicated by the macro-band-related information acquired by the information acquiring unit 133.

—Specific Techniques

First Example

As a first example, the communication control unit 135 performs the following process on each of one or more individual bands included in the macro band. The communication control unit 135 calculates a distance between the macro cell base station 200 and the small cell base station 300 based on the position of the macro cell base station 200 and the position of the small cell base station 300, and calculates a propagation loss (a negative value) based on the distance. Then, the communication control unit 135 adds the propagation loss to the maximum transmission power when the macro cell base station 200 uses an individual band. Further, the communication control unit 135 determines whether or not the sum (that is, the value obtained through addition) is larger than a predetermined threshold value (for example, −60 dBm). Then, when the sum is larger than the predetermined threshold value, the communication control unit 135 may include the individual band as the frequency band (that is, the small band) available to the small cell base station 300. On the other hand, when the sum is equal to or less than the predetermined threshold value, the communication control unit 135 does not include the individual band as the frequency band available to the small cell base station 300. The above-described process is performed on each of one or more individual bands included in the macro band, the individual band is included in the small band, and the small band is finally decided.

In other words, when it is possible to suppress or avoid interference on another system using the individual band, and it is possible to secure the maximum transmission power larger than the predetermined threshold value for the individual band, the individual band is included in the frequency band available to the small cell base station 300 (that is, the small band). Here, the maximum transmission power corresponds to the size of a communication area (that is, a cell). Thus, in other words, when the communication area of the small cell base station 300 when the small cell base station 300 uses the individual band is included in the communication area of the macro cell base station 200 when the macro cell base station 200 uses the individual band and larger than a predetermined size, the individual band is included in the frequency band available to the small cell base station 300 (that is, the small band). This point will be described below using a specific example with reference to FIG. 4.

Figure 4:
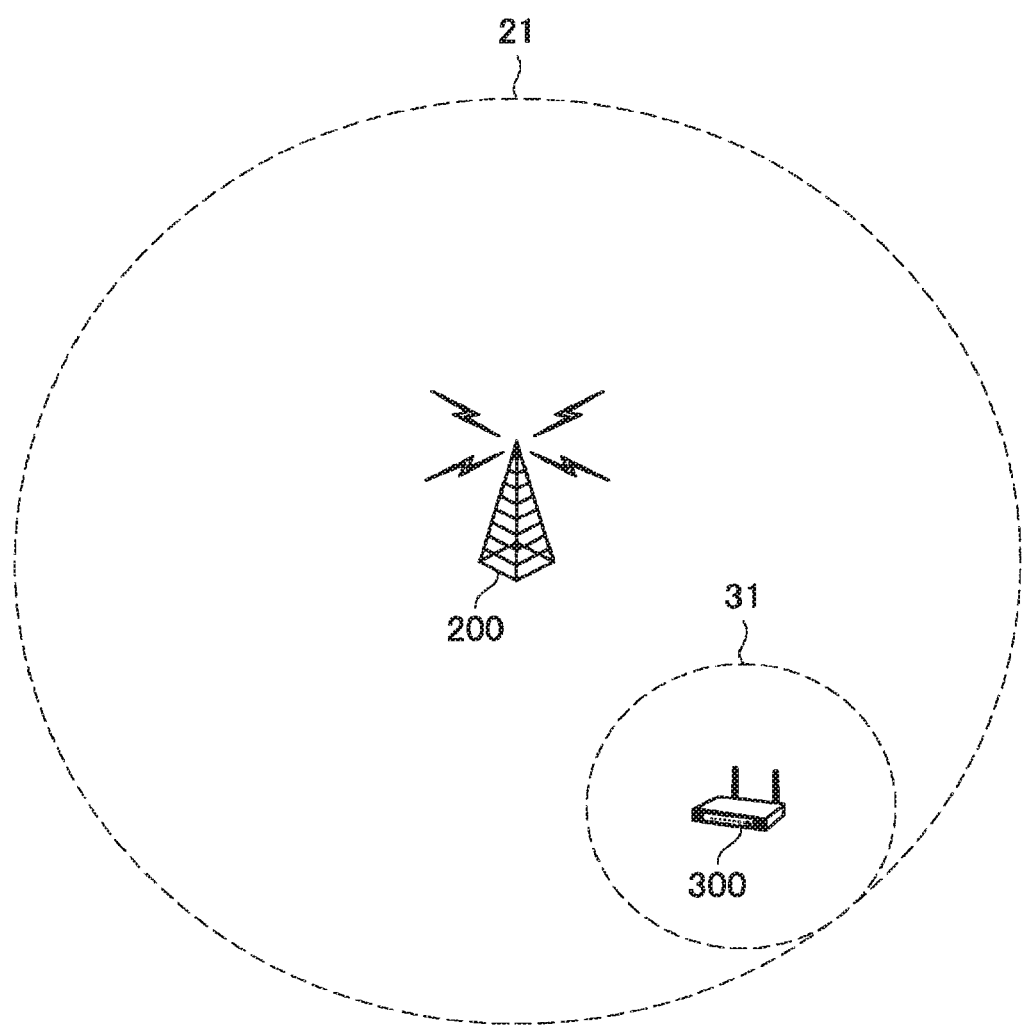
FIG. 4 is a first explanatory diagram for describing an example of a technique of deciding a small band.

FIG. 4 is a first explanatory diagram for describing a technique of deciding the small band. Referring to FIG. 4, the macro cell base station 200 and the small cell base station 300 are illustrated. A communication area 21 of the macro cell base station 200 when the macro cell base station 200 uses the individual band included in the macro band is illustrated. The communication area 21 corresponds to the maximum transmission power when the macro cell base station 200 uses an individual band. A communication area 31 of the small cell base station 300 when the small cell base station 300 uses the individual band included in the macro band is illustrated. The communication area 31 corresponds to the maximum transmission power when the small cell base station 300 uses the individual band. The maximum transmission power is a result of adding the propagation loss in the path from the macro cell base station 200 to the small cell base station 300 to the maximum transmission power when the macro cell base station 200 uses an individual band. When the size of the communication area 31 is larger than a predetermined size, the individual band is included in the frequency band available to the small cell base station 300 (that is, the small band). In other words, when the addition result is larger than a predetermined threshold value, the individual band is included in a band available to the small cell base station 300 (that is, the small band).

Second Example

As the first example, the technique in which only downlink is considered has been described, but a technique in which uplink as well as downlink is considered may be employed as a second example. More specifically, for example, an area (for example, the communication area 31 of FIG. 4) that the downlink signal transmitted from the small cell base station 300 using the individual band included in the macro band reaches is smaller than an area that the uplink signal transmitted from the terminal apparatus communicating with the small cell base station 300 can reach. For this reason, the individual band may be included in the frequency band available to the small cell base station 300 only when the area in which the uplink signal reaches is included in the communication area of the macro cell base station 200 when the macro cell base station 200 uses the individual band. This point will be described below using a specific example with reference to FIG. 5.

Figure 5:
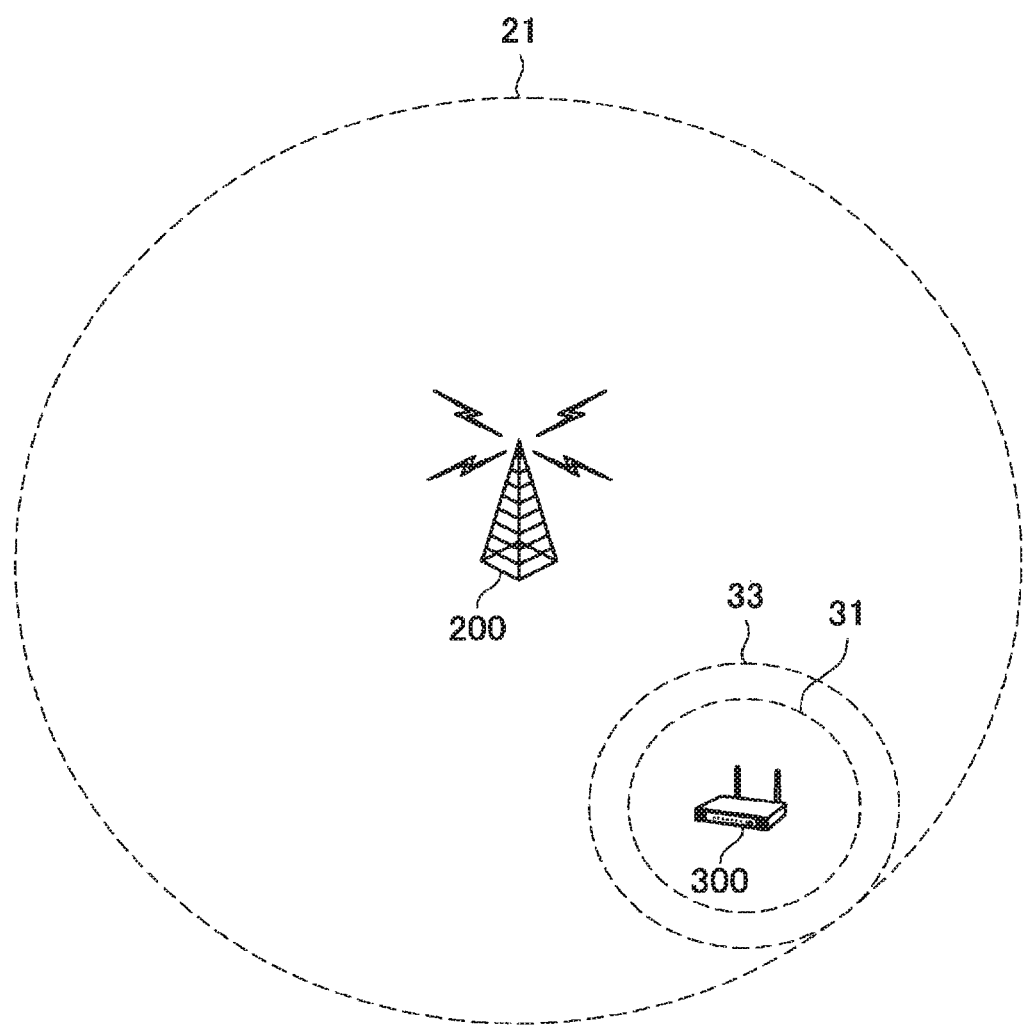
FIG. 5 is a first explanatory diagram for describing an example of a technique of deciding a small band.

FIG. 5 is a first explanatory diagram for describing an example of a technique of deciding the small band. Referring to FIG. 5, the macro cell base station 200 and the small cell base station 300 are illustrated. A communication area 21 of the macro cell base station 200 when the macro cell base station 200 uses the individual band included in the macro band is illustrated. The communication area 21 corresponds to the maximum transmission power when the macro cell base station 200 uses an individual band. A communication area 31 of the small cell base station 300 when the small cell base station 300 uses the individual band included in the macro band and an area 33 that the uplink signal transmitted from the terminal apparatus within the communication area 31 toward the small cell base station 300 can reach are illustrated. The communication the area 33 corresponds to a result of adding the propagation loss in the path from the macro cell base station 200 to the small cell base station 300 to the maximum transmission power when the macro cell base station 200 uses an individual band. For example, the communication area 31 is an area having a size of a predetermined percentage (for example, 50%) of the size of the communication the area 33. When the size of the communication area 31 is larger than a predetermined size, the individual band is included in the frequency band (that is, the small band) available to the small cell base station 300. In other words, when the sum is larger than a threshold value larger than the threshold value of the first example, the individual band is included in the frequency band available to the small cell base station 300 (that is, the small band).

Third Example

As a third example, the macro-band-related information may include the information indicating the maximum transmission power when a communication node uses the individual band at a plurality of positions in the macro cell 20 in addition to the information indicating the maximum transmission power when the macro cell base station 200 uses the individual band. The plurality of positions may be plotted in a grid form or a radial form. A position closest to the small cell base station 300 among the plurality of positions may be selected. Thereafter, the propagation loss is calculated based on the selected position and the position of the small cell base station 300, and the propagation loss is added to the maximum transmission power when the communication node uses the individual band at the selected position. When the sum is larger than a predetermined threshold value, the individual band may be included in the frequency band available to the small cell base station 300 (that is, the small band).

Fourth Example

As a fourth example, the frequency band available to the small cell base station 300 (that is, the small band) among the macro bands may be further decided so that no interference occurs between the small cell base station 300 and another base station (the macro cell base station 200 and/or another small cell base station 300) in the techniques of the first to third examples. For example, when the two or more small cell base stations 300 are positioned adjacent to each other, the individual band may be included in the frequency band available to the small cell base station 300 (that is, the small band) for some small cell base stations 300 among the two or more small cell base stations 300.

Further, after the small band is decided, interference control may be dynamically performed without considering interference between the small cell base station 300 and another base station.

(a-3) Small Band to be Decided

The small band to be decided may be consecutive frequency bands or non-consecutive frequency bands. Specifically, for example, the small band may include two or more consecutive individual bands or may include two or more non-consecutive individual bands. Alternatively, the small band may be one individual band.

As described above, the communication control unit 135 decides the small band. The information processing apparatus 100 may correspond to the two or more macro cell base stations 200. For this reason, the communication control unit 135 may decide the frequency band (that is, the small band) available to the small cell base station 300 corresponding to the macro cell base station 200 for each of the two or more macro cell base stations 200.

(b) Decision of Maximum Transmission Power

For example, the communication control unit 135 decides the maximum transmission power when the small cell base station 300 uses the frequency band (that is, the small band) available to the small cell base station 300.

—Decision Based on Position

For example, the communication control unit 135 decides the maximum transmission power based on the position of the small cell base station 300. The position of the small cell base station 300 is indicated by the position information of the small cell base station 300 acquired by the information acquiring unit 133.

For example, the communication control unit 135 decides the maximum transmission power based on the position of the macro cell base station 200. The position of the macro cell base station 200 is indicated by the position information of the macro cell base station 200 acquired by the information acquiring unit 133.

—Decision Based on Maximum Transmission Power of Macro Cell Base Station

For example, the communication control unit 135 decides the maximum transmission power when the small cell base station 300 uses the small band based on the maximum transmission power when the macro cell base station 200 uses the macro band. The maximum transmission power when the macro cell base station 200 uses the macro band is indicated by the macro-band-related information acquired by the information acquiring unit 133.

—Specific Techniques

As a first example, as described above, the communication control unit 135 adds the propagation loss to the maximum transmission power when the macro cell base station 200 uses the individual band. Then, the communication control unit 135 decides the sum as the maximum transmission power when the small cell base station 300 uses the individual band. As a result, for example, the communication area of the small cell base station 300 when the small cell base station 300 uses the individual band becomes the communication area 31 illustrated in FIG. 4.

As a second example, as described above, the communication control unit 135 adds the propagation loss to the maximum transmission power when the macro cell base station 200 uses the individual band. Then, the communication control unit 135 decides a value smaller than the sum as the maximum transmission power when the small cell base station 300 uses the small band. As a result, for example, the communication area of the small cell base station 300 when the small cell base station 300 uses the individual band becomes the communication area 31 illustrated in FIG. 5.

As a third example, the maximum transmission power may be decided so that no interference occurs between the small cell base station 300 and another base station (the macro cell base station 200 and/or another small cell base station 300) in the techniques of the first example and the second example. For example, when the two or more small cell base stations 300 are positioned adjacent to each other, the maximum transmission power when the two or more small cell base stations 300 use the small band may be decided so that the two or more communication area of the small cell base station 300 do not overlap.

As described above, the communication control unit 135 decides the maximum transmission power when the small cell base station 300 uses the small band. As a result, for example, it is possible to flexibly adjust the maximum transmission power. Thus, it is possible to further increase a possibility that the small cell base station 300 can use the frequency band. Further, the interference can be prevented or suppressed.

The deciding of the maximum transmission power means deciding of the communication area of the small cell base station 300 when the small cell base station 300 uses the small band as well.

(c) Decision of Available Period

For example, the communication control unit 135 decides the available period of the small band to the small cell base station 300.

Specifically, for example, the communication control unit 135 decides a first available period of the small band and a second available period of the small band so that the first available period to the macro cell base station 200 does not overlap the second available period to the small cell base station 300. As a result, for example, it is possible to prevent or suppress interference between the macro cell base station 200 and the small cell base station 300. For example, when the two or more small cell base stations 300 are positioned adjacent to each other, the communication control unit 135 may decide the available periods of the small band of the small cell base stations 300 so that the available periods of the small band of the two or more small cell base stations 300 do not overlap. As a result, for example, it is possible to prevent or suppress interference between the small cell base stations 300.

The macro cell base station 200 may be set not to use the small band. In this case, the available period of the small band to the small cell base station 300 may be the same as the available period of the macro band.

(d) Provision of Small-Band-Related Information

For example, the communication control unit 135 provides the band-related information related to the small band (that is, the frequency band available to the small cell base station 300 among the macro bands) (this information is hereinafter referred to as "small-band-related information") to the small cell base station 300.

(d-1) Small-Band-Related Information

—Small Band

For example, the small-band-related information includes information indicating the small band.

—Maximum transmission power

For example, the small-band-related information includes the information indicating the maximum transmission power when the small cell base station 300 uses the small band.

As described above, the small band may include the two or more individual bands. In this case, the small-band-related information may include the information indicating the maximum transmission power of each individual band.

—Available Period

For example, the small-band-related information includes information indicating the available period of the small band to the small cell base station 300.

As described above, the small band may include the two or more individual bands. In this case, the small-band-related information may include information indicating the available period of each individual band.

—Available Area

For example, the small-band-related information may include information indicating an available area of the small band. As a result, for example, when the small cell base station 300 is mobile (for example, the small cell base station 300 is a mobile router), interference arising from the small cell base station 300 can be prevented or suppressed.

(d-2) Trigger of Provision

For example, as described above, the communication control unit 135 decides the small band, the maximum transmission power when the small cell base station 300 uses the small band, and the available period of the small band to the small cell base station 300. In this case, the communication control unit 135 provides the small-band-related information to the small cell base station 300.

As described above, the small-band-related information is provided to the small cell base station 300. As a result, for example, the small cell base station 300 can use the small band.

(e) Provision of Macro-Band-Related Information

For example, the communication control unit 135 provides the macro-band-related information to the macro cell base station 200.

Specifically, for example, the controller 50 provides the macro-band-related information to the information processing apparatus 100, and the macro-band-related information is stored in the storage unit 120. Thereafter, the information acquiring unit 133 acquires the macro-band-related information, and the communication control unit 135 provides the macro-band-related information to the macro cell base station 200.

The communication control unit 135 may instruct the macro cell base station 200 to multicast or broadcast the macro-band-related information.

(f) Others

For example, as described above, the communication control unit 135 decides the small band. In this case, the communication control unit 135 decides a condition under which the macro cell base station 200 uses the small band among the macro bands (hereinafter referred to as a "small band use condition"). Then, the communication control unit 135 may provide information indicating the small band use condition (hereinafter referred to as "small band use condition information") to the base station 200.

For example, the small band use condition includes the first available period of the small band to the macro cell base station 200. As a result, for example, it is possible to prevent or suppress interference between the macro cell base station 200 and the small cell base station 300.

The small band use condition may include the maximum transmission power when the macro cell base station 200 uses the small band. The communication control unit 135 may decide the maximum transmission power so that interference between the macro cell base station 200 and the small cell base station 300 is prevented or suppressed.

The configuration of the information processing apparatus 100 according to the first embodiment has been described above. As described above, the information processing apparatus 100 decides the frequency band (that is, the small band) available to the small cell base station 300 among the macro bands (that is, the frequency bands available to the macro cell base station 200 among the shared bands). As a result, for example, it is possible to prevent the load from being concentrated on a specific node when the frequency band is shared between the cellular system employing the HetNet and another system. More specifically, for example, the frequency management system 40 decides the macro band but need not decide the small band, and thus the load is prevented from being concentrated on the frequency management system 40 (and the controller 50).

2.2. Configuration of Macro Cell Base Station

Figure 6:
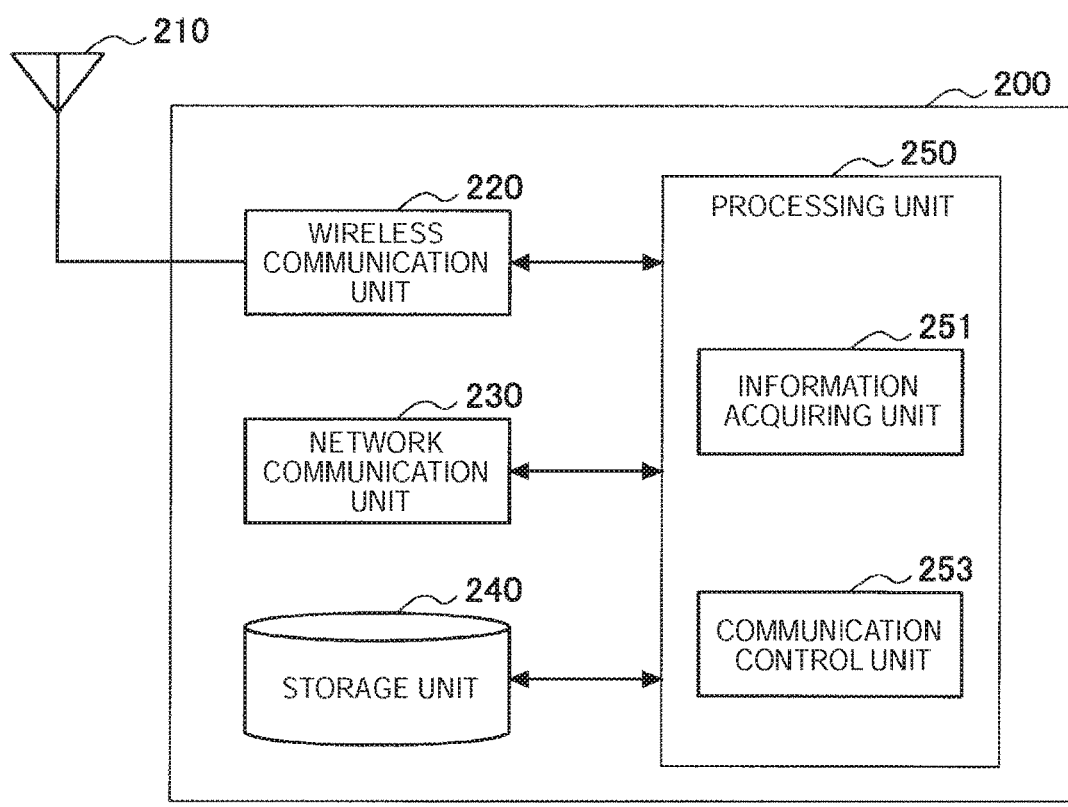
FIG. 6 is a block diagram illustrating an example of a configuration of a macro cell base station according to the first embodiment.

Next, an example of a configuration of the macro cell base station 200 according to the first embodiment will be described with reference to FIG. 6. FIG. 6 is a block diagram illustrating an example of a configuration of the macro cell base station 200 according to the first embodiment. Referring to FIG. 6, the macro cell base station 200 includes an antenna unit 210, a wireless communication unit 220, a network communication unit 230, a storage unit 240, and a processing unit 250.

(Antenna Unit 210)

The antenna unit 210 radiates a signal output from the wireless communication unit 220 into the air as radio waves. The antenna unit 210 converts the radio waves in the air into a signal, and outputs the signal to the wireless communication unit 220.

(Wireless Communication Unit 220)

The wireless communication unit 220 transmits or receives a signal. For example, the wireless communication unit 220 transmits the downlink signal to the terminal apparatus positioned within the macro cell 20, and receives the uplink signal from the terminal apparatus positioned within the macro cell 20.

(Network Communication Unit 230)

The network communication unit 230 transmits or receives information. For example, the network communication unit 230 transmits information to another node, and receives information from another node. For example, another node includes the information processing apparatus 100 and another core network node. For example, another node includes the small cell base station 300 and another macro cell base station 200.

(Storage Unit 240)

The storage unit 240 temporarily or permanently stores a program and data for an operation of the macro cell base station 200.

(Processing Unit 250)

The processing unit 250 provides various functions of the macro cell base station 200. The processing unit 250 includes an information acquiring unit 251 and a communication control unit 253. The processing unit 250 may further include any other component in addition to the above-mentioned components. In other words, the processing unit 250 may also perform an operation other than operations of the above-mentioned components.

(Information Acquiring Unit 251)

(a) Acquisition of Macro-Band-Related Information

The information acquiring unit 251 acquires the macro-band-related information.

For example, the macro cell base station 200 requests the information processing apparatus 100 to give the permission for the use of the shared band by the macro cell base station 200. In this case, the information processing apparatus 100 provides the macro-band-related information to the macro cell base station 200. Then, the information acquiring unit 251 acquires the macro-band-related information.

(b) Acquisition of Small Band Use Condition Information

For example, the information acquiring unit 251 acquires the small band use condition information.

For example, when the small band is decided, the information processing apparatus 100 provides the small band use condition information to the macro cell base station 200. Then, the information acquiring unit 251 acquires the small band use condition information.

(Communication Control Unit 253)

(a) Multicasting/Broadcasting of Macro-Band-Related Information

The communication control unit 253 controls multicasting or broadcasting of the macro-band-related information by the macro cell base station 200.

(a-1) Trigger of Control

For example, when the information acquiring unit 251 acquires the macro-band-related information, the communication control unit 253 controls multicasting or broadcasting such that the macro-band-related information is multicast or broadcast.

The macro cell base station 200 may multicast or broadcast the macro-band-related information only when the macro-band-related information is updated. Alternatively, the macro cell base station 200 may multicast or broadcast the macro-band-related information at regular intervals.

(a-2) Frequency Band to be Used

For example, the macro cell base station 200 performs the multicasting or the broadcasting using the cellular band.

(a-3) Specific Process

As a specific process, for example, the communication control unit 253 generates multicast information or broadcast information (for example, system information) including the macro-band-related information, and allocates radio resources of the cellular band to the multicast information or the broadcast information.

(a-4) Adjustment of Transmission Power

For example, the communication control unit 253 controls the multicasting or the broadcasting such that the multicasting or the broadcasting is performed at the transmission power corresponding to the maximum transmission power when the macro cell base station 200 uses the macro band (that is, the frequency band available to the macro cell base station 200 among the shared bands).

For example, as described above, the macro-band-related information includes the information indicating the maximum transmission power when the macro cell base station 200 uses the macro band. The communication control unit 253 decides the transmission power for the multicasting or the broadcasting such that the transmission power for the multicasting or the broadcasting is equal to the maximum transmission power.

As a result, for example, the macro-band-related information can be provided to only the small cell base station 300 that is likely to use some or all of the macro bands among the small cell base stations 300.

The macro band may include the two or more individual bands. The macro-band-related information may include information related to the individual band for each of the two or more individual bands. Particularly, the macro-band-related information includes the information indicating the maximum transmission power for the individual band for each of the two or more individual bands. In this case, under the control of the communication control unit 253, the macro cell base station 200 may multicast or broadcast the information related to the individual band at the transmission power (for example, the maximum transmission power) corresponding to the maximum transmission power for the individual band for each of the two or more individual bands. A multicasting or broadcasting timing for each of the two or more individual bands may be a common timing or may be a timing that differs according to each individual band.

As described above, the macro-band-related information is multicast or broadcast. As a result, for example, the macro-band-related information can be provided even to the small cell base station 300 that is a mobile apparatus (for example, a mobile router). Control information transmitted and received by the macro cell base station 200 can be reduced to be smaller than in the case of unicasting.

(b) Wireless Communication Using Macro Band

For example, the communication control unit 253 controls wireless communication by the macro cell base station 200 using the macro band (that is, the frequency band available to the macro cell base station 200 among the shared bands).

For example, the communication control unit 253 performs a setting for the use of the macro band based on the macro-band-related information. For example, the communication control unit 253 sets a band to be used among the macro bands, the maximum transmission power, a use period, and/or the like. When the macro band includes the two or more individual bands, some or all of the two or more individual bands may be set as the band to be used among the macro bands. In other words, the macro cell base station 200 may use some or all of the macro bands.

For example, the communication control unit 253 performs a setting for the use of the small band among the macro bands based on the small band use condition. For example, the communication control unit 253, the communication control unit 253 sets the maximum transmission power, the use period, and/or the like for the small band. As a result, for example, it is possible to prevent or suppress interference between the macro cell base station 200 and the small cell base station 300.

2.3. Configuration of Small Cell Base Station

Figure 7:
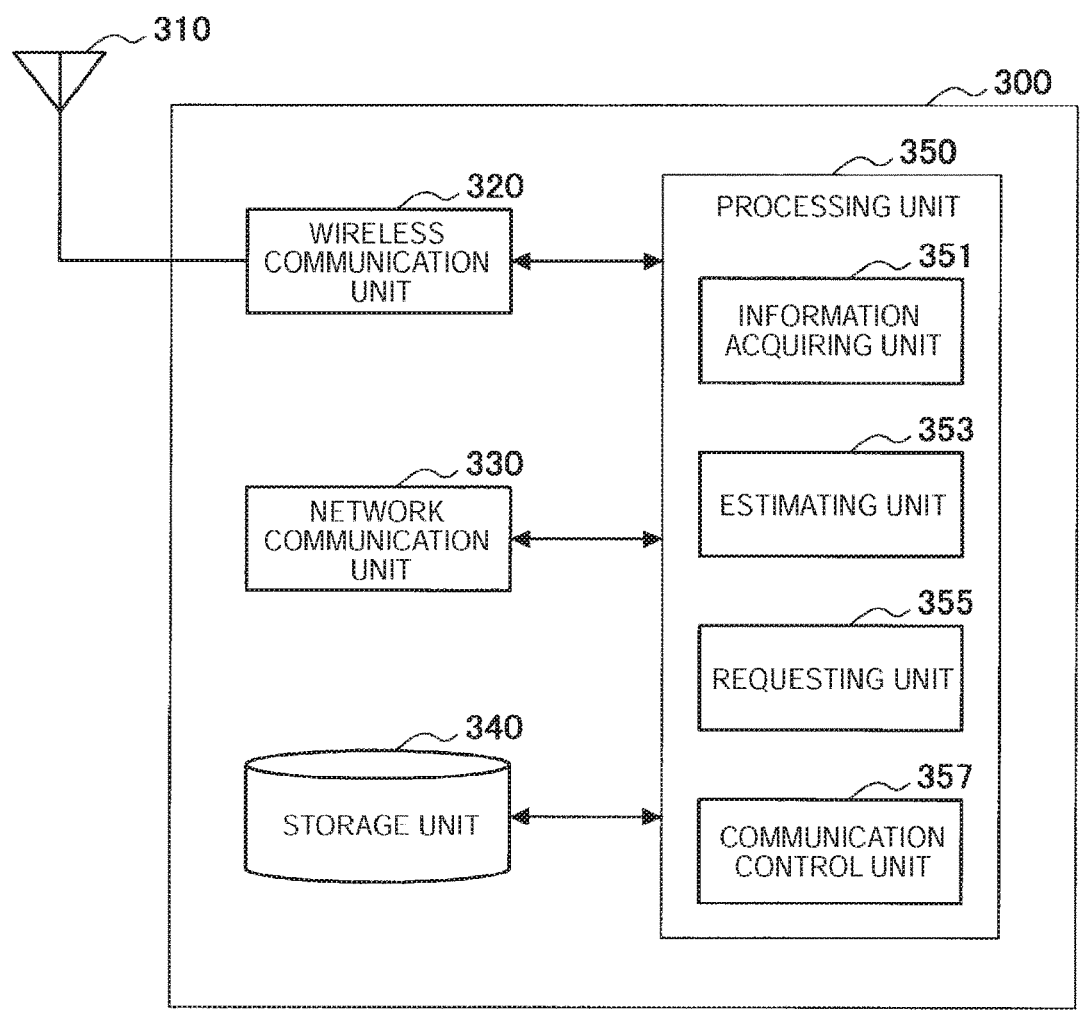
FIG. 7 is a block diagram illustrating an example of a configuration of a small cell base station according to the first embodiment.

Next, an example of a configuration of the small cell base station 300 according to the first embodiment will be described with reference to FIG. 7. FIG. 7 is a block diagram illustrating an example of a configuration of the small cell base station 300 according to the first embodiment. Referring to FIG. 7, the small cell base station 300 includes an antenna unit 310, a wireless communication unit 320, a network communication unit 330, a storage unit 340, and a processing unit 350.

(Antenna Unit 310)

The antenna unit 310 radiates a signal output from the wireless communication unit 320 into the air as radio waves. The antenna unit 310 converts the radio waves in the air into a signal, and outputs the signal to the wireless communication unit 320.

(Wireless Communication Unit 320)

The wireless communication unit 320 transmits or receives a signal. For example, the wireless communication unit 320 transmits the downlink signal to the terminal apparatus positioned within the small cell 30, and receives the uplink signal from the terminal apparatus positioned within the small cell 30. The wireless communication unit 320 receives a signal transmitted from the macro cell base station 200.

(Network Communication Unit 330)

The network communication unit 330 transmits or receives information. For example, the network communication unit 330 transmits information to another node, and receives information from another node. For example, another node includes the information processing apparatus 100 and another core network node. For example, another node includes the macro cell base station 200 and another small cell base station 300.

For example, the network communication unit 330 transmits or receives information via a wired backhaul. The small cell base station 300 may be a mobile apparatus that can operate as a base station (for example, a mobile router). In this case, the network communication unit 330 may transmit or receive information via a wireless backhaul.

(Storage Unit 340)

The storage unit 340 temporarily or permanently stores a program and data for an operation of the small cell base station 300.

(Processing Unit 350)

The processing unit 350 provides various functions of the small cell base station 300. The processing unit 350 includes an information acquiring unit 351, an estimating unit 353, a requesting unit 355, and a communication control unit 357. The processing unit 350 may further include any other component in addition to the above-mentioned components. In other words, the processing unit 350 may also perform an operation other than operations of the above-mentioned components.

(Information Acquiring Unit 351)

(a) Acquisition of Macro-Band-Related Information

The information acquiring unit 351 acquires the macro-band-related information.

For example, the macro cell base station 200 multicasts or broadcasts the macro-band-related information. In this case, for example, the small cell base station 300 receives the macro-band-related information, and stores the macro-band-related information in the storage unit 340. At any one of subsequent timings, the information acquiring unit 351 acquires the macro-band-related information.

When the small cell base station 300 is not positioned within a region in which the multicast or broadcast macro-band-related information can be received, the information acquiring unit 351 does not acquire the macro-band-related information.

(b) Acquisition of Position Information

—Position Information of Small Cell Base Station 300

For example, the information acquiring unit 351 acquires the position information indicating the position of the small cell base station 300

For example, the position information is stored in the storage unit 340, and the information acquiring unit 351 acquires the position information from the storage unit 340.

As an example, the small cell base station 300 includes a Global Positioning System (GPS) receiver, and the position information is generated by the GPS receiver and stored in the storage unit 340. As another example, the position information may be input by an operator of the cellular system and stored in the storage unit 340.

—Position Information of Macro Cell Base Station 200

For example, the information acquiring unit 351 acquires the position information indicating the position of the macro cell base station 200.

For example, the position information is stored in the storage unit 340, and the information acquiring unit 351 acquires the position information from the storage unit 340.

For example, the position information is provided from the information processing apparatus 100 or the macro cell base station 200 to the small cell base station 300 and stored in the storage unit 340.

(Estimating Unit 353)

(a) Estimation of Small Band.

The estimating unit 353 estimates the frequency band available to the small cell base station 300 (that is, the small band) among the macro bands (that is, the frequency bands available to the macro cell base station 200 among the shared bands).

—Estimation Based on Macro-Band-Related Information

For example, the estimating unit 353 estimates the small band based on the macro-band-related information.

As described above, the macro-band-related information includes information indicating the macro band, the maximum transmission power when the macro cell base station 200 uses the macro band, and the like.

—Estimation Based on Position

For example, the estimating unit 353 estimates the small band based on the position of the small cell base station 300. The position of the small cell base station 300 is indicated by the position information of the small cell base station 300 acquired by the information acquiring unit 351.

For example, the estimating unit 353 decides the small band based on the position of the macro cell base station 200. The position of the macro cell base station 200 is indicated by the position information of the macro cell base station 200 acquired by the information acquiring unit 351.

—Specific Technique

For example, the estimating unit 353 estimates the small band through the same technique as the specific technique of deciding the small band through the communication control unit 135 of the information processing apparatus 100 (the first example described with reference to FIG. 4, the second example described with reference to FIG. 5, or the third example).
(b) Estimation of Maximum Transmission Power For example, the estimating unit 353 estimates the maximum transmission power when the small cell base station 300 uses the frequency band (that is, the small band) available to the small cell base station 300.
—Estimation Based on Macro-Band-Relate d Information For example, the estimating unit 353 estimates the maximum transmission power based on the macro-band-related information.
—Estimation Based on Position For example, the estimating unit 353 estimates the maximum transmission power based on the position of the small cell base station 300. For example, the estimating unit 353 estimates the maximum transmission power based on the position of the macro cell base station 200.
—Specific Technique For example, the estimating unit 353 estimates the maximum transmission power through the same technique as the specific technique of deciding the maximum transmission power through the communication control unit 135 of the information processing apparatus 100.

The estimating of the maximum transmission power means estimating of the communication area of the small cell base station 300 when the small cell base station 300 uses the small band as well.
(Requesting Unit 355)

When there is a small band (that is, the frequency band available to the small cell base station 300 among the macro bands), the requesting unit 355 requests the permission for the use of the shared band by the small cell base station 300.

Thus, for example, it is possible to prevent a situation in which the permission is requested although there is no small band. As a result, the number of requests can be reduced, and the load on the information processing apparatus 100 can be reduced.
(a) Condition for Maximum Transmission Power For example, when it is determined that there is a small band as a result of estimating the small band, the requesting unit 355 requests the permission for the use of the shared band by the small cell base station 300 if a condition for the maximum transmission power when the small cell base station 300 uses the small band is satisfied.

More specifically, for example, the condition for the maximum transmission power is a condition that an estimation result of the maximum transmission power when the small cell base station 300 uses the small band is higher than a predetermined threshold value. In other words, when it is determined that there is a small band as a result of estimating the small band, and the estimation result of the maximum transmission power when the small cell base station 300 uses the small band is higher than a predetermined threshold value, the requesting unit 355 requests the permission for the use of the shared band by the small cell base station 300.

As a result, the permission for the use of the small band is requested, for example, only when the use of the small band is valid. As a result, the number of requests can be further reduced, and the load on the information processing apparatus 100 can be reduced.

The predetermined threshold value may be set according to a traffic volume in the small cell 30 of the small cell base station 300. Specifically, for example, the predetermined threshold value is set to a small value when the traffic volume is large, and the predetermined threshold value is set to a large value when the traffic volume is small.

The predetermined threshold value may be set according to an instruction given from the information processing apparatus 100 (for example, the communication control unit 135). In this case, the predetermined threshold value may be set according to a use state of the small band by another small cell base station 300.
(b) Request Technique For example, the requesting unit 355 transmits the permission-to-use request message for requesting the permission for the use of the shared band by the small cell base station 300 to the information processing apparatus 100 through the network communication unit 330.

The requesting unit 355 may provide a small band estimation result to the information processing apparatus 100 when requesting the information processing apparatus 100 to give the permission for the use of the shared band by the small cell base station 300. Then, the information processing apparatus 100 (for example, the communication control unit 135) may decide the small band using the small band estimation result.
(Communication Control Unit 357)

The communication control unit 357 controls wireless communication by the small cell base station 300 using the small band (that is, the frequency band available to the small cell base station 300 among the macro bands).
(a) Setting Based on Small-Band-Related Information For example, the requesting unit 355 requests the information processing apparatus 100 to give the permission for the use of the shared band by the small cell base station 300, and as a result, the information processing apparatus 100 provides the small-band-related information to the small cell base station 300. In this case, the communication control unit 357 performs a setting for the use of the small band based on the small-band-related information. For example, the communication control unit 357 sets a band to be used among the small bands, the maximum transmission power, the use period, and/or the like. When the small band includes the two or more individual bands, some or all of the two or more individual bands may be set as the band to be used among the small bands. In other words, the small cell base station 300 may use some or all of the small bands.
(b) Use of Small Band as SCC The communication control unit 357 controls wireless communication using the small band so that some or all of the small bands are used as a secondary component carrier (SCC) of carrier aggregation (CA).

A primary component carrier (PCC) corresponding to the SCC (some or all of the small bands) may be a frequency band used by the small cell base station 300 or a frequency band used by the macro cell base station 200.

As a specific process, for example, the communication control unit 357 activates some or all of the small bands as the SCC.
(c) Others As described above, for example, the small-band-related information may include the information indicating the available area of the small band. The small cell base station 300 may be a mobile apparatus (for example, a mobile router) that can operate as a base station. In this case, when the small cell base station 300 leaves the available area, the communication control unit 357 stops the use of the small band by the small cell base station 300. Thereafter, the requesting unit 355 may request the permission for the use of the shared band by the small cell base station 300 again as necessary.

2.4. Flow of Process

Next, an example of a process according to the first embodiment will be described with reference to FIGS. 8 and 9.

(First Process)

Figure 8:
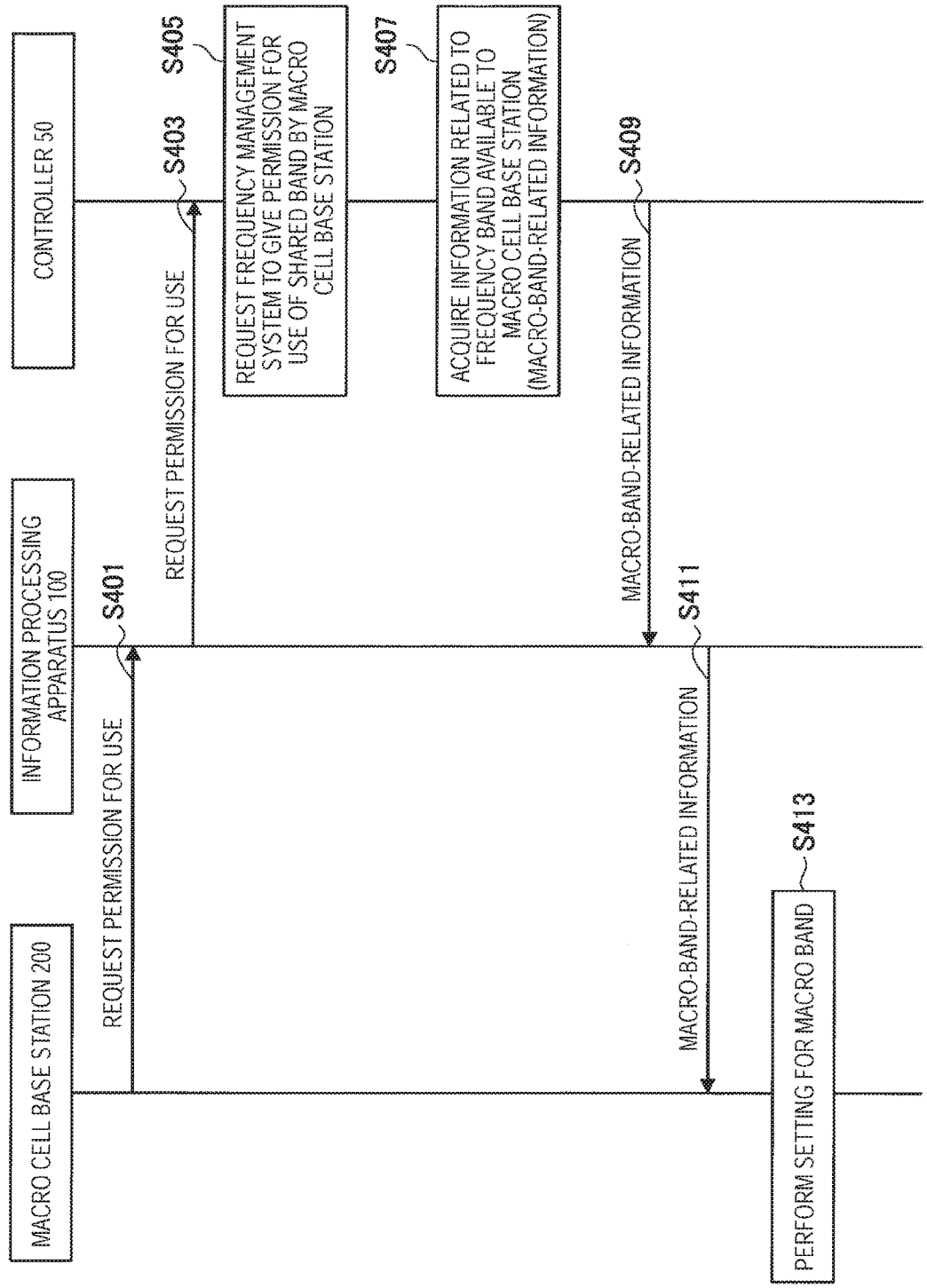
FIG. 8 is a sequence diagram illustrating an example of a schematic flow of a first process according to the first embodiment.

FIG. 8 is a sequence diagram illustrating an example of a schematic flow of a first process according to the first embodiment. The first process is a process of acquiring the macro-band-related information. In other words, the first process is a process of getting the permission for the use of the shared band by the macro cell base station 200.

The macro cell base station 200 requests the information processing apparatus 100 to give the permission for the use of the shared band (that is, the frequency band shared between the cellular system and another system) by the macro cell base station 200 (S401).

In this case, the information processing apparatus 100 requests the controller 50 to give the permission for the use of the shared band by the macro cell base station 200 (S403).

Then, the controller 50 requests the frequency management system 40 to give the permission for the use of the shared band by the macro cell base station 200 (S405).

In this case, for example, the frequency management system 40 provides the information related to the frequency band available to the macro cell base station 200 (that is, the macro band) among the shared bands (that is, the macro-band-related information) to the controller 50, and the controller 50 acquires the information (S4007).

Thereafter, the controller 50 provides the macro-band-related information to the information processing apparatus 100 (S409).

Then, the information processing apparatus 100 provides the macro-band-related information to the macro cell base station 200 (S411).

Thereafter, the macro cell base station 200 performs a setting for the use of the macro band based on the macro-band-related information (S413).

(Second Process)

Figure 9:
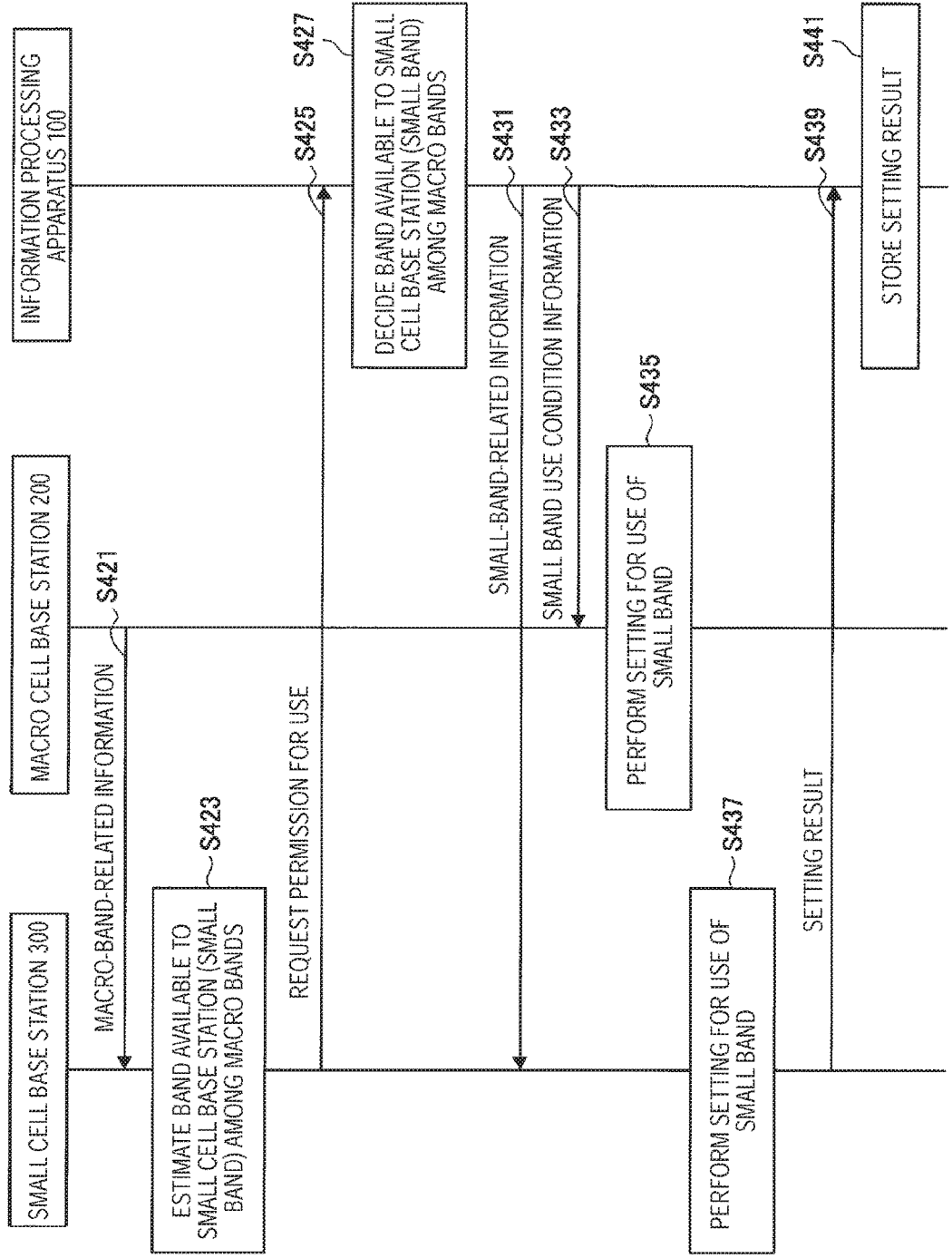
FIG. 9 is a sequence diagram illustrating an example of a schematic flow of a second process according to the first embodiment.

FIG. 9 is a sequence diagram illustrating an example of a schematic flow of a second process according to the first embodiment. The second process is a process of providing and acquiring the small-band-related information. In other words, the second process is a process of getting the permission for the use of the shared band by the small cell base station 300.

The macro cell base station 200 multicasts or broadcasts the information related to the frequency band available to the macro cell base station 200 (that is, the macro band) among the shared bands shared between the cellular system and another system (that is, the macro-band-related information) (S421) The multicasting or the broadcasting may be performed according to an instruction given from the information processing apparatus 100.

Then, the small cell base station 300 estimates the frequency band available to the small cell base station 300 (that is, the small band) among the macro bands (S423). As a result, for example, there is determined to be a band available to the small cell base station 300 among the macro bands.

Thereafter, the small cell base station 300 requests the information processing apparatus 100 to give the permission for the use of the shared band by the small cell base station 300 (S425).

In this case, the information processing apparatus 100 decides the frequency band available to the small cell base station 300 (that is, the small band) among the macro bands (S427).

Thereafter, the information processing apparatus 100 provides the information related to the small band (that is, the small-band-related information) to the small cell base station 300 (S431). Further, the information processing apparatus 100 provides the information indicating the condition under which the macro cell base station 200 uses the small band (that is, the small band use condition information) to the macro cell base station 200 (S433).

The macro cell base station 200 performs a setting for the use of the small band based on the small band use condition information (S435).

The small cell base station 300 performs a setting for the use of the small band based on the small-band-related information (S437).

Then, the small cell base station 300 provides the setting result for the use of the small band to the information processing apparatus 100 (S439), and the information processing apparatus 100 stores the setting result (S441).

2.5. First Modified Example

Next, a first modified example of the first embodiment will be described According to the first modified example, the information processing apparatus 100 (the communication control unit 135) decides the frequency band available to the small cell base station 300 (that is, the small band) based on the traffic volume in the small cell 30 of the small cell base station 300.

(Small Cell Base Station 300: Requesting Unit 355)

(c) Provision of Information

The requesting unit 355 provides information indicating the traffic volume (hereinafter referred to as "traffic volume information") in the small cell 30 of the small cell base station 300 to the information processing apparatus 100.

For example, the requesting unit 355 transmits the permission-to-use request message including the traffic volume information to the information processing apparatus 100 through the network communication unit 330.

The traffic volume may be a total traffic volume in a certain period or may be an average value of traffic volumes. Alternatively, the traffic volume may be a future traffic volume that is predicted.

(Information Processing Apparatus 100: Information Acquiring Unit 133)

(d) Acquisition of Additional Information

The information acquiring unit 133 acquires the traffic volume information.

(Information Processing Apparatus 100: Communication Control Unit 135)

(a) Decision of Small Band (a-2) Decision Technique

—Decision Based on Traffic Volume

The communication control unit 135 decides the frequency band available to the small cell base station 300 (that is, the small band) among the macro bands based on the traffic volume in the small cell 30 of the small cell base station 300.

—Specific Technique

As described above, as a fourth example, the frequency band available to the small cell base station 300 (that is, the small band) among the macro bands may be further decided so that no interference occurs between the small cell base station 300 and another base station (the macro cell base station 200 and/or another small cell base station 300) in the techniques of the first to third examples. For example, when the two or more small cell base stations 300 are positioned adjacent to each other, the individual band may be included in the frequency band available to the small cell base station 300 (that is, the small band) for some small cell base stations 300 among the two or more small cell base stations 300.

In the first modified example of the first embodiment, for example, when the two or more small cell base stations 300 are positioned adjacent to each other, the communication control unit 135 preferentially allocates the individual band to the small cell base station 300 with a large traffic volume among the two or more small cell base stations 300. As an example, a first small cell base station 300 and a second small cell base station 300 are positioned adjacent to each other. Further, a first traffic volume in the small cell 30 of the small cell base station 300 is larger than a second traffic volume in the small cell 30 of the small cell base station 300. In this case, for example, the communication control unit 135 decides the small band of the first small cell base station 300 including more individual bands and the small band of the second small cell base station 300 including fewer individual bands.

The first modified example of the first embodiment has been described above. According to the first modified example, for example, more bands can be used in the small cell 30 having a large traffic volume.

2.6. Second Modified Example

Next, a second modified example of the first embodiment will be described. According to the second modified example, the information processing apparatus 100 (the communication control unit 135) decides the frequency band available to the small cell base station 300 (that is, the small band) based on a priority of data that is transmitted and received by the small cell base station 300.
(Small Cell Base Station 300: Requesting Unit 355)
(c) Provision of Information The requesting unit 355 provides information indicating a priority (hereinafter referred to as "priority information") of data that is transmitted and received by the small cell base station 300 to the information processing apparatus 100.

For example, the requesting unit 355 transmits the permission-to-use request message including the priority information to the information processing apparatus 100 through the network communication unit 330.

For example, a priority is set according to a type of data. As an example, a high priority is set to voice call data and streaming delivery data. The priority information may indicate a sum of priorities of all data that is transmitted and received by the small cell base station 300 or may indicate an average value of priorities of data that is transmitted and received by the small cell base station 300. Alternatively, the priority information may be a percentage of a traffic having a priority equal to higher than a certain priority for all traffic.
(Information Processing Apparatus 100: Information Acquiring Unit 133)
(d) Acquisition of Additional Information The information acquiring unit 133 acquires the priority information.
(Information Processing Apparatus 100: Communication Control Unit 135)
(a) Decision of Small Band
(a-2) Decision Technique
—Decision Based on Priority of Data The communication control unit 135 decides the frequency band available to the small cell base station 300 (that is, the small band) among the macro bands based on a priority of data that is transmitted and received by the small cell base station 300.
—Specific Technique As described above, as a fourth example, the frequency band available to the small cell base station 300 (that is, the small band) among the macro bands may be further decided so that no interference occurs between the small cell base station 300 and another base station (the macro cell base station 200 and/or another small cell base station 300) in the techniques of the first to third examples. For example, when the two or more small cell base stations 300 are positioned adjacent to each other, the individual band may be included in the frequency band available to the small cell base station 300 (that is, the small band) for some small cell base stations 300 among the two or more small cell base stations 300.

In the second modified example of the first embodiment, for example, when the two or more small cell base stations 300 are positioned adjacent to each other, the communication control unit 135 preferentially allocates the individual band to the small cell base station 300 that transmits and receives data having a high priority among the two or more small cell base stations 300. As an example, the first small cell base station 300 and the second small cell base station 300 are positioned adjacent to each other. A priority of data that is transmitted and received by the first small cell base station 300 is higher than a priority of data that is transmitted and received by the second small cell base station 300. In this case, for example, the communication control unit 135 decides the small band of the first small cell base station 300 including more individual bands and the small band of the second small cell base station 300 including fewer individual bands.

The second modified example of the first embodiment has been described above. According to the second modified example, for example, the small cell base station 300 that transmits and receives data having a high priority can use more bands.

2.7. Third Modified Example

Next, a third modified example of the first embodiment will be described. According to the third modified example, the information processing apparatus 100 (the communication control unit 135) decides the frequency band available to the small cell base station 300 (that is, the small band) based on communication quality in the small cell 30 of the small cell base station 300.
(Small Cell Base Station 300: Requesting Unit 355)
(c) Provision of Information The requesting unit 355 provides information indicating the communication quality (hereinafter referred to as "communication quality information") in the small cell 30 of the small cell base station 300 to the information processing apparatus 100.

For example, the requesting unit 355 transmits the permission-to-use request message including the communication quality information to the information processing apparatus 100 through the network communication unit 330.

The communication quality includes a channel quality indicator (CQI), a reference signal received power (RSRP), reference signal received quality (RSRQ), and/or a signal to interference and noise ratio (SINR) which are transmitted from the terminal apparatus to the small cell base station 300. The communication quality may include an average rate of data that is transmitted and received through a bearer between the small cell base station 300 and the terminal apparatus. The communication quality may be an average value of the communication quality of a plurality of terminal apparatuses.
(Information Processing Apparatus 100: Information Acquiring Unit 133)
(d) Acquisition of Additional Information
The information acquiring unit 133 acquires the communication quality information.
(Information Processing Apparatus 100: Communication Control Unit 135)
(a) Decision of Small Band
(a-2) Decision Technique
—Decision Based on Communication Quality
The communication control unit 135 decides the frequency band available to the small cell base station 300 (that is, the small band) among the macro bands based on the communication quality in the small cell 30 of the small cell base station 300.
—Specific Technique
As described above, as a fourth example, the frequency band available to the small cell base station 300 (that is, the small band) among the macro bands may be further decided so that no interference occurs between the small cell base station 300 and another base station (the macro cell base station 200 and/or another small cell base station 300) in the techniques of the first to third examples. For example, when the two or more small cell base stations 300 are positioned adjacent to each other, the individual band may be included in the frequency band available to the small cell base station 300 (that is, the small band) for some small cell base stations 300 among the two or more small cell base stations 300.

In the third modified example of the first embodiment, for example, when the two or more small cell base stations 300 are positioned adjacent to each other, the communication control unit 135 preferentially allocates the individual band to the small cell base station 300 of the small cell 30 with better communication quality among the two or more small cell base stations 300. As an example, the first small cell base station 300 and the second small cell base station 300 are positioned adjacent to each other. The communication quality in the small cell 30 of the first small cell base station 300 is better than the communication quality in the small cell 30 of the second small cell base station 300. In this case, for example, the communication control unit 135 decides the small band of the first small cell base station 300 including more individual bands and the small band of the second small cell base station 300 including fewer individual bands.
(b) Decision of Maximum Transmission Power
—Decision Based on Communication Quality
For example, the communication control unit 13 decides the maximum transmission power when the small cell base station 300 uses the small band based on the communication quality in the small cell 30 of the small cell base station 300.
—Specific Technique
As described above, as a third example, the maximum transmission power may be decided so that no interference occurs between the small cell base station 300 and another base station (the macro cell base station 200 and/or another small cell base station 300) in the techniques of the first example and the second example. For example, when the two or more small cell base stations 300 are positioned adjacent to each other, the maximum transmission power when the two or more small cell base stations 300 use the small band may be decided so that the two or more communication area of the small cell base station 300 do not overlap.

In the third modified example of the first embodiment, for example, when the two or more small cell base stations 300 are positioned adjacent to each other, the communication control unit 135 decides the maximum transmission power so that the small cell base station 300 with better communication quality among the two or more small cell base stations 300 has higher maximum transmission power. As an example, the first small cell base station 300 and the second small cell base station 300 are positioned adjacent to each other. The communication quality in the small cell 30 of the first small cell base station 300 is better than the communication quality in the small cell 30 of the second small cell base station 300. In this case, the communication control unit 135 may decide the maximum transmission power so that the first small cell base station 300 has higher maximum transmission power, and the second small cell base station 300 has lower maximum transmission power.

The third modified example of the first embodiment has been described above. According to the third modified example, for example, the small cell base station 300 with the better communication quality can use more bands. Further, according to the third modified example, for example, it is possible to cause the small cell base station 300 with the better communication quality to have the higher maximum transmission power.

2.8. Fourth Modified Example

Next, a fourth modified example of the first embodiment will be described. According to the fourth modified example, the information processing apparatus 100 (the communication control unit 135) performs exchange of the frequency bands available to the small cell base station 300 (that is, the small bands) between the two or more small cell base stations 300 based on the communication quality in the two or more small cells 30 of the small cell base station 300.
(Small Cell Base Station 300: Requesting Unit 355)
(c) Provision of Information
The requesting unit 355 provides information indicating the communication quality (that is, communication quality information) in the small cell 30 of the small cell base station 300 to the information processing apparatus 100.

For example, the requesting unit 355 transmits the permission-to-use request message including the communication quality information to the information processing apparatus 100 through the network communication unit 330.

The communication quality includes a CQI, a RSRP, RSRQ, and/or a SINR which are transmitted from the terminal apparatus to the small cell base station 300. The communication quality may include an average rate of data that is transmitted and received through a bearer between the small cell base station 300 and the terminal apparatus. The communication quality may be an average value of the communication quality of a plurality of terminal apparatuses.
(Information Processing Apparatus 100: Information Acquiring Unit 133)
(d) Acquisition of Additional Information
The information acquiring unit 133 acquires the communication quality information.
(Information Processing Apparatus 100: Communication Control Unit 135)
(a) Decision of Small Band
(a-4) Exchange of Small Band
The information processing apparatus 100 (the communication control unit 135) performs exchange of the small band between the two or more small cell base stations 300 based on the communication quality in the two or more small cells 30 of the small cell base station 300.

For example, when the first small cell base station 300 and the second small cell base station 300 are positioned adjacent to each other, the communication control unit 135 decides exchange of the small bands between the first small cell base station 300 and the second small cell base station 300. More specifically, for example, the communication control unit 135 specifies a first individual band having bad communication quality among the small bands of the first small cell base station 300. The communication control unit 135 specifies a second individual band having bad communication quality among the small bands of the second small cell base station 300. Then, when the first individual band is not identical to the second individual band, the communication control unit 135 decides to exchange the first individual band and the second individual band. Then, the communication control unit 135 instructs the first small cell base station 300 and the second small cell base station 300 to perform the exchange (that is, to change the small bands). As a result, the small band of the first small cell base station 300 includes the second individual band instead of the first individual band, and the small band of the second small cell base station 300 includes the first individual band instead of the second individual band. The communication control unit 135 may instruct the terminal apparatus performing wireless communication with the first small cell base station 300 to measure the communication quality for the second individual band having the bad communication quality, instruct the terminal apparatus performing wireless communication with the second small cell base station 300 to measure the communication quality for the first individual band having the bad communication quality, and instruct the first small cell base station 300 and the second small cell base station 300 to perform the exchange (that is, to change the small bands) only when the communication quality will be improved. The measuring of the communication quality may be performed in a period called a measurement gap.

The fourth modified example of the first embodiment has been described above. According to the fourth modified example, for example, it is possible to improve the communication quality in the small cell 30.

2.9. Fifth Modified Example

Next, a fifth modified example of the first embodiment will be described. According to the fifth modified example, the information processing apparatus 100 (the requesting unit 131) provides information indicating the traffic volumes in the macro cell 20 of the macro cell base station 200 and the small cell 30 of the small cell base station 300 to the controller 50. The macro band (that is, the frequency band available to the macro cell base station 200 among the shared bands) is a band decided based on the traffic volume.

(Information Processing Apparatus 100: Requesting Unit 131)

(c) Provision of Information

—Provision of Traffic Volume Information

The requesting unit 131 provides information indicating the traffic volumes (hereinafter referred to as "traffic volume information") in the macro cell 20 of the macro cell base station 200 and the small cell 30 of the small cell base station 300 to the controller 50.

—Traffic Volume

For example, the traffic volume is a traffic volume of each macro cell 20 and a sum of traffic volumes in the macro cell 20 and all the small cells 30 corresponding to the macro cell 20.

For example, the traffic volume is a current traffic volume or a traffic volume in a certain period (for example, a traffic volume in a certain period in the past or a traffic volume that is predicted in a certain period in the future).

—Acquisition of Traffic Volume Information

For example, the processing unit 130 (for example, the requesting unit 131) collects information indicating a traffic volume of each base station from each base station (the macro cell base station 200 or the small cell base station 300). Then, the processing unit 130 (for example, the requesting unit 131) calculates a sum of the collected traffic volumes. As a result, the requesting unit 131 acquires the traffic information.

Instead of collecting the information indicating the traffic volume of each base station from each base station (the macro cell base station 200 or the small cell base station 300), the processing unit 130 (for example, the requesting unit 131) may collect information indicating a traffic volume from the router 70.

—Provision Timing

For example, the requesting unit 131 provides the traffic volume information to the controller 50 when requesting the controller 50 to give the permission for the use of the shared band by the macro cell base station 200. More specifically, for example, the requesting unit 131 transmits the permission-to-use request message including the traffic volume information through the controller 50.

(Controller 50/Frequency Management System 40)

The controller 50 requests the frequency management system 40 to give the permission for the use of the shared band by the macro cell base station 200 based on the traffic volume information provided from the information processing apparatus 100.

For example, the controller 50 requests the frequency management system 40 to give the permission for the use of the shared band by the macro cell base station 200 according to a priority corresponding to the traffic volume indicated by the traffic volume information. For example, the priority is high when the traffic volume is large but low when the traffic volume is small.

For example, when the priority is high, the frequency management system 40 preferentially decides the macro band so that the macro band (that is, the frequency band available to the macro cell base station 200 among the shared bands) becomes a broader band.

The fifth modified example of the first embodiment has been described above. According to the fifth modified example, for example, for example, when the traffic volume is large, the frequency band available to the macro cell base station 200 becomes broader.

3. SECOND EMBODIMENT

Figure 10:
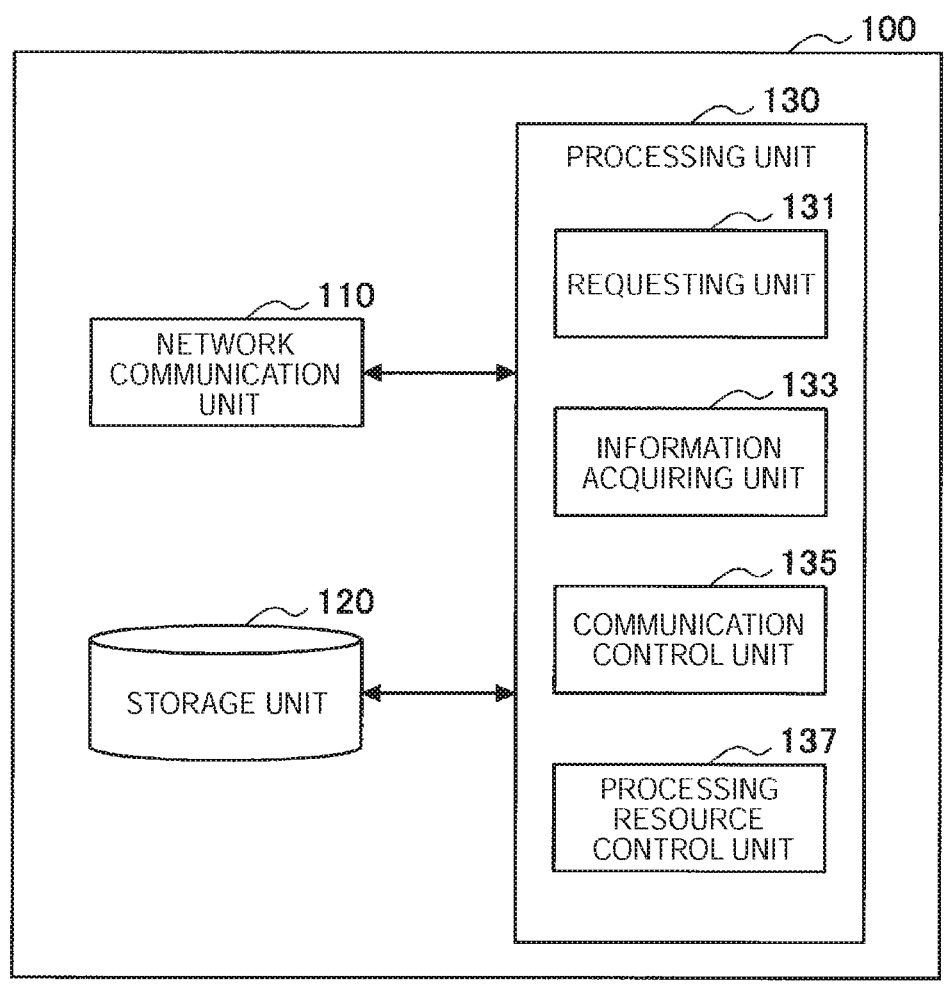
FIG. 10 is a block diagram illustrating an example of a configuration of an information processing apparatus according to a second embodiment.

Next, a second embodiment of the present disclosure will be described with reference to FIGS. 10 and 11.

In the second embodiment, processing resources for the communication control unit 135 of the information processing apparatus 100 are increased or decreased. As a result, for example, it is possible to flexibly change correspondence of the macro cell base station 200 to the information processing apparatus 100.

A description of the macro cell base station 200 and the small cell base station 300 according to the second embodiment is the same as the description of the macro cell base station 200 and the small cell base station 300 according to the first embodiment. The first to fifth modified examples according to the first embodiment can be similarly applied to the second embodiment. Thus, the description will proceed with only a configuration of the information processing apparatus 100 according to the second embodiment and a process flow according to the second embodiment.

<3.1. Configuration of Information Processing Apparatus>

First, an example of a configuration of the information processing apparatus 100 according to the second embodiment will be described with reference to FIG. 10. FIG. 10 is a block diagram illustrating an example of a configuration of the information processing apparatus 100 according to the second embodiment. Referring to FIG. 10, the information processing apparatus 100 includes a communication unit 110, a storage unit 120, and a processing unit 130.

Here, a difference between the information processing apparatus 100 according to the first embodiment and the information processing apparatus 100 according to the second embodiment lies in that the information processing apparatus 100 according to the second embodiment includes a processing resource control unit 137, but the information processing apparatus 100 according to the first embodiment does not include the processing resource control unit 137. Thus, only the processing resource control unit 137 will be described herein.

(Processing Resources Control Unit 137)

The processing resource control unit 137 increases or decreases the processing resources for the communication control unit 135.

For example, the communication control unit 135 decides the frequency band available to the small cell base station 300 (the small band) for each of the two or more small cell base stations 300. The processing resource control unit 137 increases or decreases the processing resources for the communication control unit 135 based on the number of small cell base stations 300 that are being operated among the two or more small cell base stations 300.

Specifically, for example, the processing unit 130 (for example, the processing resource control unit 137) manages an operation mode of each of the two or more small cell base stations 300 corresponding to the information processing apparatus 100. As an example, the processing unit 130 (for example, the processing resource control unit 137) acquires information indicating the operation mode (hereinafter referred to as "operation mode information") from each of the two or more small cell base stations 300, and stores the information in the storage unit 120. The operation mode information indicates at least whether or not the small cell base station 300 is in an operation state. The operation mode may be one of two modes of an "operation state" and a "stop state" or may be one of three or more types of modes.

For example, the processing resource control unit 137 counts the number of small cell base stations 300 in the operation state based on the operation mode information of the two or more small cell base stations 300. Then, the processing resource control unit 137 determines whether or not it is necessary to increase or decrease the processing resources for the communication control unit 135 based on the number of small cell base stations 300 in the operation state. As an example, when the number of small cell base stations 300 in the operation state is changed, the processing resource control unit 137 determines that it is necessary to increase or decrease the processing resources for the communication control unit 135. Then, the processing resource control unit 137 increases or decreases the processing resources for the communication control unit 135 based on the number of small cell base stations 300 in the operation state. For example, when the number of small cell base stations 300 in the operation state is increased, the processing resource control unit 137 increases the processing resources for the communication control unit 135 so that the amount of the processing resources for the communication control unit 135 becomes an amount corresponding to the number of small cell base stations 300 in the operation state. Further, for example, when the number of small cell base stations 300 in the operation state is decreased, the processing resource control unit 137 decreases the processing resources for the communication control unit 135 so that the amount of the processing resources for the communication control unit 135 becomes an amount corresponding to the number of small cell base stations 300 in the operation state.

As a result, for example, it is possible to increase or decrease the processing resources according to an increase or a decrease in a processing amount of the communication control unit 135.

More specifically, for example, when the number of small cell base stations 300 in the operation state is increased, the request for the permission for the use of the shared band by the small cell base station 300 may be increased as well. As a result, the processing amount of the communication control unit 135 may be increased. Further, when the number of small cell base stations 300 in the operation state is decreased, the request for the permission for the use of the shared band by the small cell base station 300 may be decreased as well. As a result, the processing amount of the communication control unit 135 may be decreased. Thus, by increasing or decreasing the processing resources based on the number of small cell base stations 300 in the operation state, it is possible to increase or decrease the processing resources according to an increase or a decrease in the processing amount of the communication control unit 135. As a result, for example, it is possible to smoothly decide the small band while saving the processing resources.

The increase or the decrease in the processing resources may be implemented by a technique that is commonly called virtualization. The increase or the decrease in the processing resources may be implemented by varying the number of parallel processes of operation processes that are performed in parallel.

<3.2. Flow of Process>

Next, an example of a process according to the second embodiment will be described with reference to FIG. 11.

(First Process)

A first process according to the second embodiment is the same as the first process according to the first embodiment described above with reference to FIG. 8. Thus, a duplicated description is omitted here.

(Second Process)

A second process according to the second embodiment is the same as the second process according to the first embodiment described above with reference to FIG. 9. Thus, a duplicated description is omitted here.

(Processing Resource Control Process)

FIG. 11 is a flowchart illustrating an example of a schematic flow of a processing resource control process according to the second embodiment.

The processing resource control unit 137 counts the number of small cell base stations 300 in the operation state based on the operation mode information of the two or more small cell base stations 300 (S451).

Then, the processing resource control unit 137 determines whether or not it is necessary to increase or decrease the processing resources for the communication control unit 135 based on the number of small cell base stations 300 in the operation state (S453). When it is unnecessary to increase or decrease the processing resources (NO in S453), the process ends.

When it is unnecessary to increase or decrease the processing resources (YES in S453), the processing resource control unit 137 increases or decreases the processing resources for the communication control unit 135 based on the number of small cell base stations 300 in the operation state (S455). Then, the process ends.

4. APPLICATION EXAMPLES

The technology according to the present disclosure is applicable to a variety of products. The information processing apparatus 100 may be implemented as any type of server such as tower servers, rack servers, and blade servers. At least a part of components of the information processing apparatus 100 may be implemented in a module (e.g. integrated circuit module that includes a single die, or card or blade that is inserted into a slot of a blade server) mounted on a server.

The base station (the macro cell base station 200 or the small cell base station 300) may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station may be implemented as another type of base station such as Nodes B or base transceiver stations (BTSs). The base station may include the main apparatus (which is also referred to as base station apparatus) that controls wireless communication and one or more remote radio heads (RRHs) that are disposed at different locations from that of the main apparatus. Further, at least some components of the base station may be implemented in a base station apparatus or a module for a base station apparatus.

The small cell base station 300 may be implemented as a mobile terminal such as smartphones, tablet personal computers (PCs), notebook PCs, portable game terminals, portable/dongle mobile routers, and digital cameras, or an in-vehicle terminal such as car navigation apparatuses. Furthermore, at least part of components of the small cell base station 300 may be implemented as a module (e.g. integrated circuit module constituted with a single die) that is mounted on these terminals.

<4.1. Application Examples for Information Processing Apparatus>

FIG. 12 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program executed by the processor 701 and data. The storage 703 can include a storage medium such as semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

In the server 700 illustrated in FIG. 12, one or more components (the requesting unit 131, the information acquiring unit 133, the communication control unit 135, and/or the processing resource control unit) included in the processing unit 130 described above with reference to FIGS. 3 and 10 may be mounted in the processor 701. As an example, a program causing the processor to function as one or more of the components above (that is, a program causing the processor to perform the operation of one or more of the components above) may be installed in the server 700, and the processor 701 may execute the program. As another example, the server 700 may include a module including the processor 701 and the memory 702, and one or more of the components above may be mounted in the module. In this case, the module may store the program causing the processor to function as one or more of the components above in the memory 702, and the program may be executed by the processor 701. As described above, the server 700 or the module may be provided as an apparatus including one or more of the components above, and the program causing the processor to function as one or more of the components above may be provided. A readable recording medium in which the program is recorded may be provided.

<4.2. Application Examples for Macro Cell Base Station and Small Cell Base Station>

First Application Example

Figure 13:
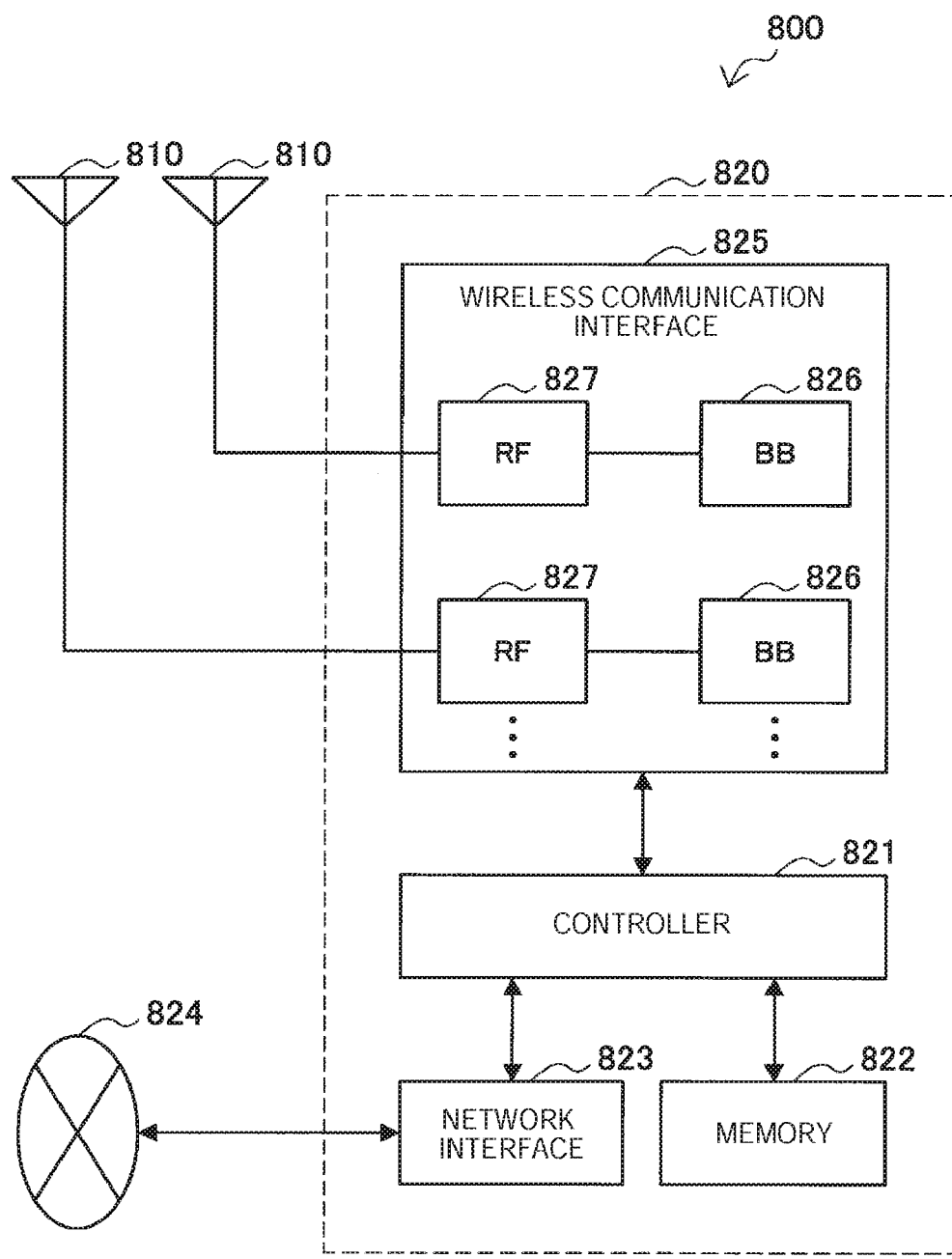
FIG. 13 is a block diagram illustrating a first example of a schematic configuration of an eNB.

FIG. 13 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 13, and the plurality of antennas 810 may, for example, correspond to a plurality of frequency bands used by the eNB 800. It should be noted that while FIG. 13 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 13, and the plurality of BB processors 826 may, for example, correspond to a plurality of frequency bands used by the eNB 800. The wireless communication interface 825 may also include a plurality of the RF circuits 827, as illustrated in FIG. 13, and the plurality of RF circuits 827 may, for example, correspond to a plurality of antenna elements. FIG. 13 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 13, one or more components included in the processing unit 350 described above with reference to FIG. 7 (the information acquiring unit 351, the estimating unit 353, the requesting unit 355, and/or the communication control unit 357) may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 800, and the wireless communication interface 825 (for example, the BB processor 826) and/or the controller 821 may execute the program. As described above, the eNB 800, the base station apparatus 820, or the module may be provided as an apparatus including one or more of the components above, and the program causing the processor to function as one or more of the components above may be provided. A readable recording medium in which the program is recorded may be provided. For these points, one or more components included in the processing unit 250 described above with reference to FIG. 6 (for example, the information acquiring unit 251 and/or the communication control unit 253) are the same as one or more of the components above included in the processing unit 350.

In the eNB 800 illustrated in FIG. 13, the wireless communication unit 320 described above with reference to FIG. 7 may be mounted in the wireless communication interface 825 (for example, the RF circuit 827). The antenna unit 310 may be mounted in the antenna 810. The network communication unit 330 may be mounted in the controller 821 and/or the network interface 823. In these points, the antenna unit 210, the wireless communication unit 220, and the network communication unit 230 described above with reference to FIG. 6 are the same as the antenna unit 310, the wireless communication unit 320, and the network communication unit 330.

Second Application Example

Figure 14:
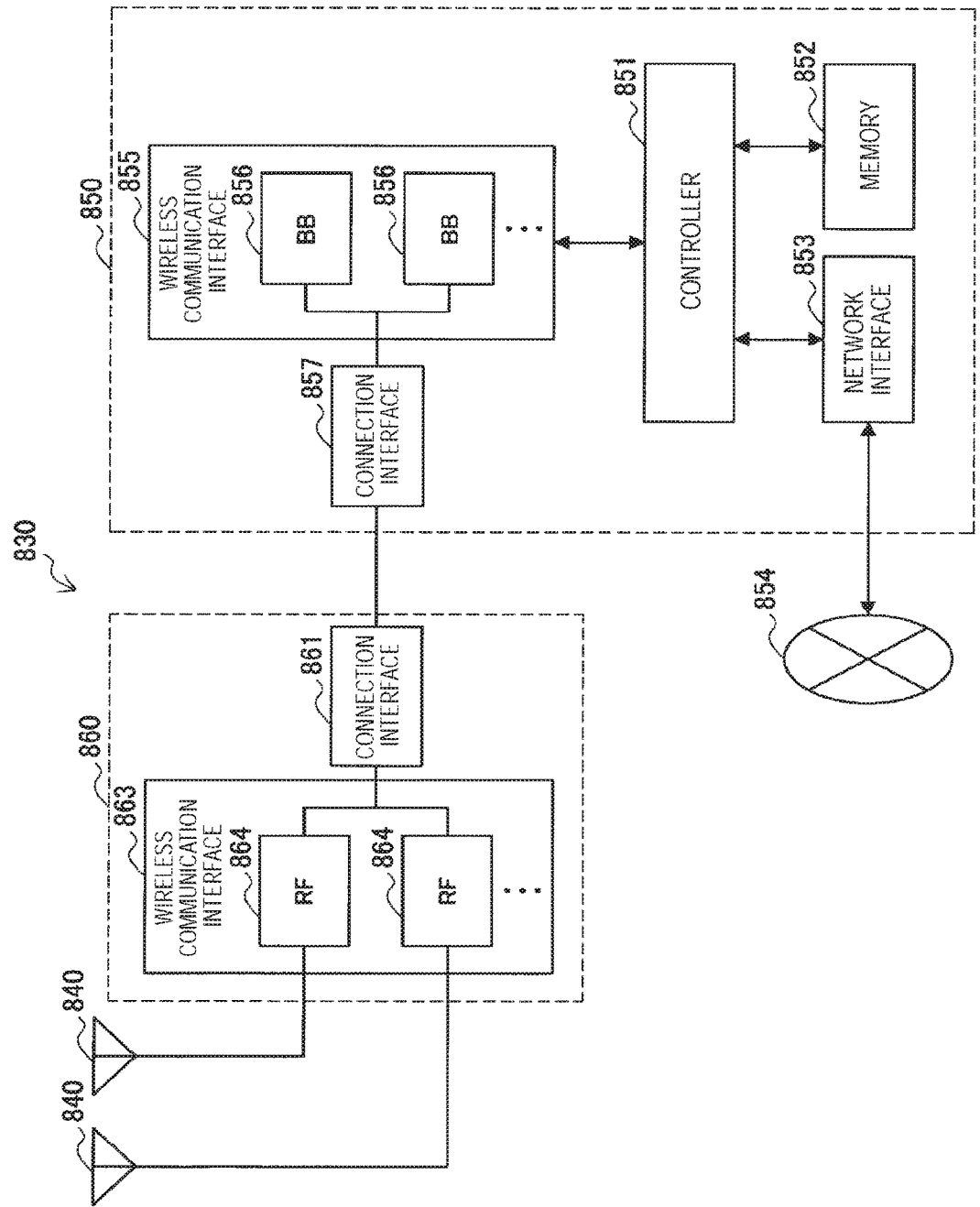
FIG. 14 is a block diagram illustrating a second example of the schematic configuration of the eNB.

FIG. 14 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 14, and the plurality of antennas 840 may, for example, correspond to a plurality of frequency bands used by the eNB 830. FIG. 14 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 13.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 13 except that the BB processor 856 is connected to an RF circuit 864 of the RRH 860 via the connection interface 857.

The wireless communication interface 855 may include a plurality of the BB processors 856, as illustrated in FIG. 14, and the plurality of BB processors 856 may, for example, correspond to a plurality of frequency bands used by the eNB 830 respectively. FIG. 14 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 14, and the plurality of RF circuits 864 may, for example, correspond to a plurality of antenna elements. FIG. 14 illustrates an example in which the wireless communication interface 863 includes the plurality of RF circuits 864, but the wireless communication interface 863 may include the single RF circuit 864.

In the eNB 830 illustrated in FIG. 14, one or more components included in the processing unit 350 described above with reference to FIG. 7 (the information acquiring unit 351, the estimating unit 353, the requesting unit 355 and/or the communication control unit 357) may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 830, and the wireless communication interface 855 (for example, the BB processor 856) and/or the controller 851 may execute the program. As described above, the eNB 830, the base station apparatus 850, or the module may be provided as an apparatus including one or more of the components above, and the program causing the processor to function as one or more of the components above may be provided. A readable recording medium in which the program is recorded may be provided. In these points, one or more components included in the processing unit 250 described above with reference to FIG. 6 (for example, the information acquiring unit 251 and/or the communication control unit 253) are the same as one or more of the components above included in the processing unit 350.

In the eNB 830 illustrated in FIG. 14, the wireless communication unit 320 described above with reference to FIG. 7 may be mounted in the wireless communication interface 863 (for example, the RF circuit 864). The antenna unit 310 may be mounted in the antenna 840. The network communication unit 330 may be mounted in the controller 851 and/or the network interface 853. In these points, the antenna unit 210, the wireless communication unit 220, and the network communication unit 230 described above with reference to FIG. 6 are the same as the antenna unit 310, the wireless communication unit 320, and the network communication unit 330.

<4.3. Application Examples for Small Cell Base Station>

First Application Example

Figure 15:
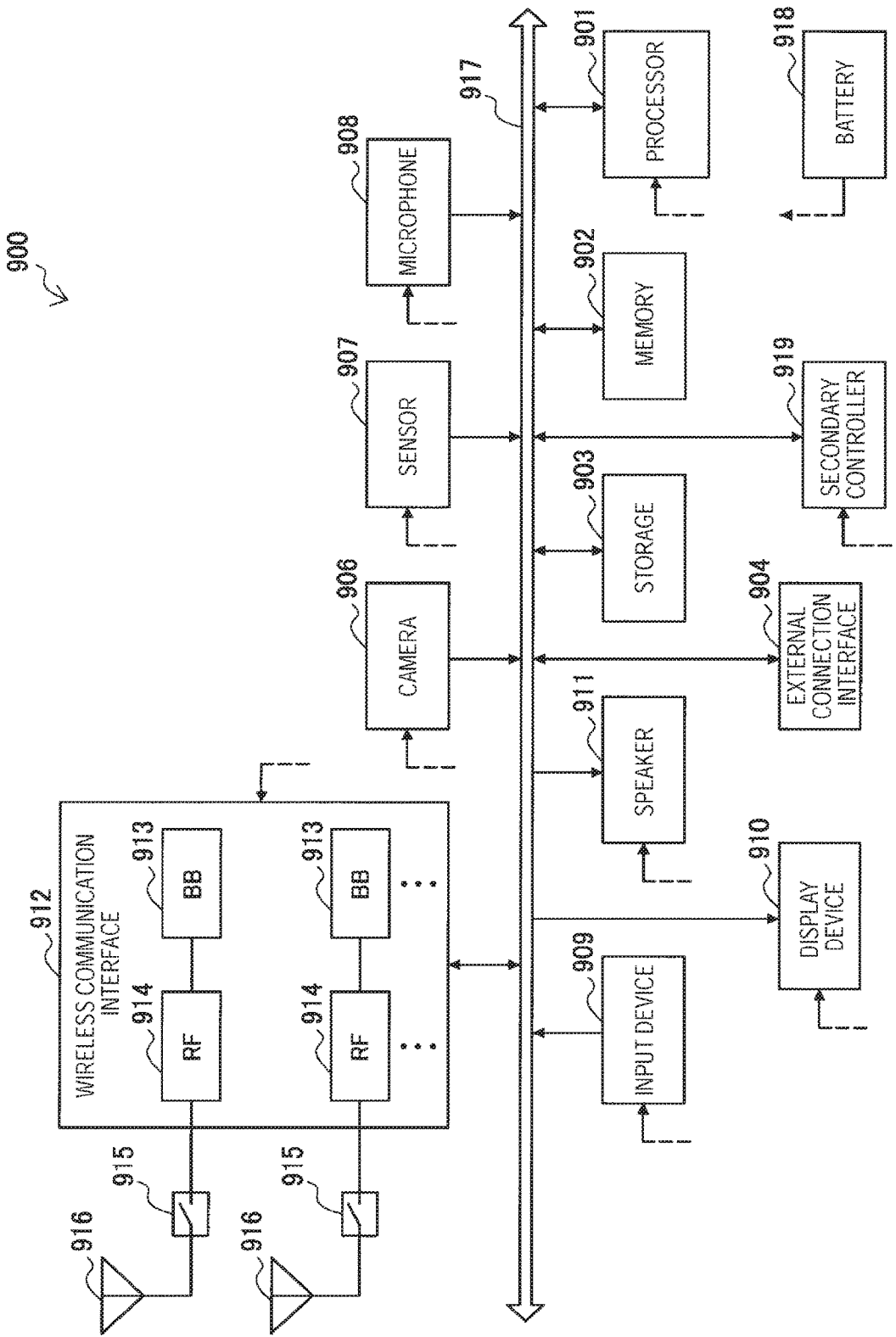
FIG. 15 is a block diagram illustrating an example of a schematic configuration of a smartphone.

FIG. 15 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 15. FIG. 15 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 15. FIG. 15 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 15 via a feeder line that is partially illustrated in the figure as a dashed line. The secondary controller 919, for example, operates a minimally necessary function of the smartphone 900 in a sleep mode.

In the smartphone 900 illustrated in FIG. 15, one or more components included in the processing unit 350 described above with reference to FIG. 7 (the information acquiring unit 351, the estimating unit 353, the requesting unit 355, and/or the communication control unit 357) may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the smartphone 900, and the wireless communication interface 912 (for example, the BB processor 913), the processor 901, and/or the secondary controller 919 may execute the program. As described above, the smartphone 900 or the module may be provided as an apparatus including one or more of the components above, and the program causing the processor to function as one or more of the components above may be provided. A readable recording medium in which the program is recorded may be provided.

In the smartphone 900 illustrated in FIG. 15, for example, the wireless communication unit 320 described above with reference to FIG. 7 may be mounted in the wireless communication interface 912 (for example, the RF circuit 914). The antenna unit 310 may be mounted in the antenna 916.

Second Application Example

Figure 16:
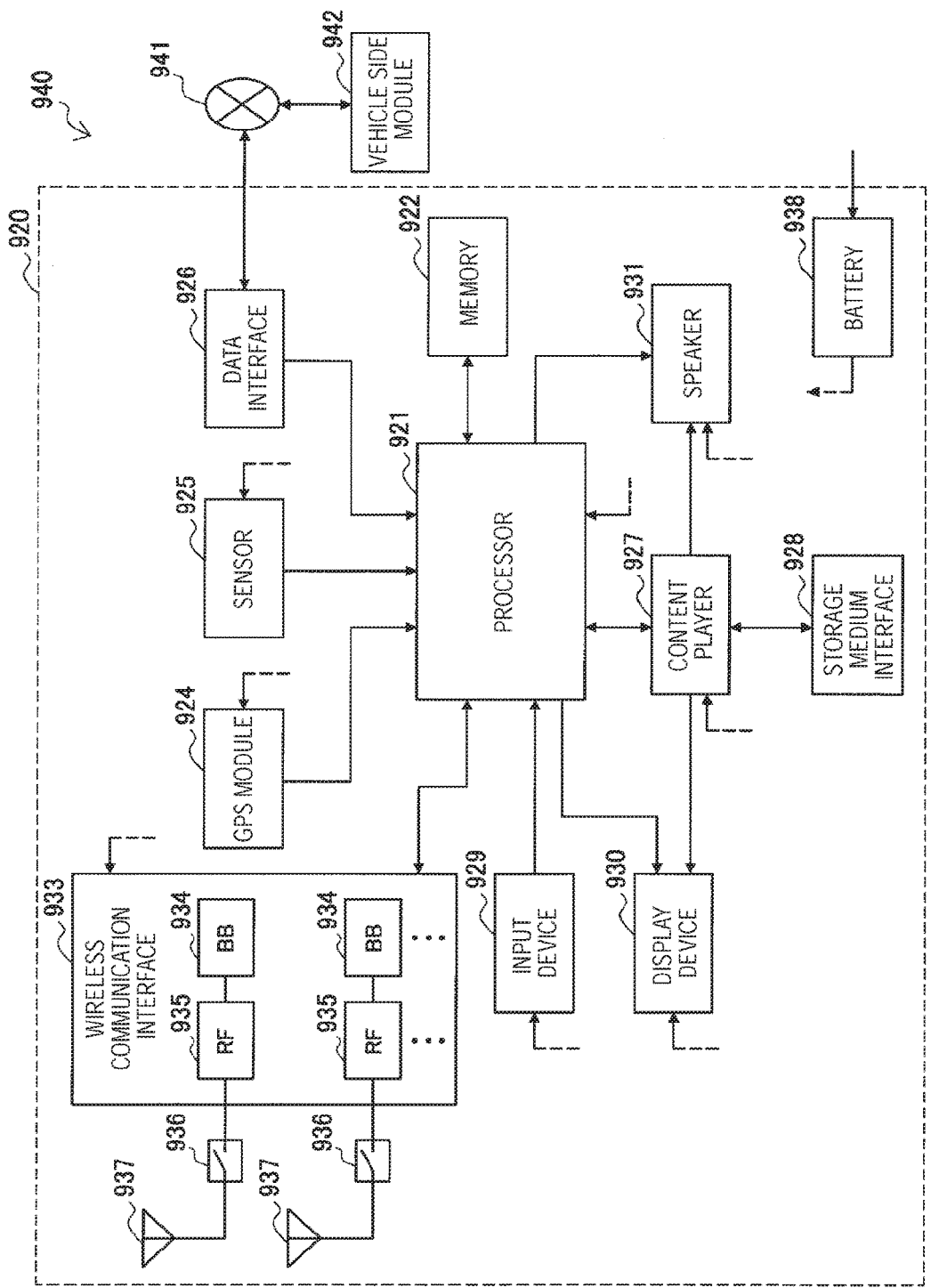
FIG. 16 is a block diagram illustrating an example of a schematic configuration of a car navigation apparatus.

FIG. 16 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 16. FIG. 16 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 16. FIG. 16 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 20 via a feeder line that is partially illustrated in the figure as a dashed line. The battery 950 accumulates the electric power supplied from the vehicle.

In the car navigation apparatus 920 illustrated in FIG. 16, among the one or more components included in the processing unit 350 described above with reference to FIG. 7 (the information acquiring unit 351, the estimating unit 353, the requesting unit 355, and/or the communication control unit 357), at least some of the components may be mounted in the processor 921. As an example, the car navigation apparatus 920 may be equipped with a module including some or all components of the wireless communication interface 933 (for example, the BB processor 934), and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the car navigation apparatus 920, and the wireless communication interface 933 (for example, the BB processor 934) and/or the processor 921 may execute the program. As described above, the car navigation apparatus 920 or the module may be provided as an apparatus including one or more of the components above, and the program causing the processor to function as one or more of the components above may be provided. A readable recording medium in which the program is recorded may be provided.

In the car navigation apparatus 920 illustrated in FIG. 16, for example, the wireless communication unit 320 described above with reference to FIG. 7 may be mounted in the wireless communication interface 933 (for example, the RF circuit 935). The antenna unit 310 may be mounted in the antenna 937.

Further, the technique according to the present disclosure may be implemented as an in-vehicle system (or a vehicle) 940 including one or more blocks of the above-described car navigation apparatus 920, an in-vehicle network 941 and a vehicle side module 942. That is, the in-vehicle system (or the vehicle) 940 may be provided as an apparatus including one more of the components above. The vehicle side module 942 generates vehicle side data such as vehicle speed, engine speed and failure information and outputs the generated data to the in-vehicle network 961.

5. CONCLUSION

The respective apparatuses and the processes according to according to the embodiments of the present disclosure have been described above with reference to FIGS. 1 to 16.

According to an embodiment of the present disclosure, the information processing apparatus 100 includes: the information acquiring unit 133 configured to acquire band-related information that is related to a frequency band available to the macro cell base station 200 of a cellular system among shared bands shared between the cellular system and another system and is provided from the controller 50 for a plurality of macro cell base stations 200 of the cellular system; and the communication control unit 135 configured to decide a frequency band available to the small cell base station 300 corresponding to the macro cell base station 200 among the frequency bands available to the macro cell base station 200.

Thus, it is possible to prevent the load from being concentrated on a specific node, for example, when the frequency band is shared between the cellular system employing the HetNet and another system.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the information processing apparatus is a different apparatus from the macro cell base station has been described, but the present disclosure is not limited to this example. For example, the macro cell base station may be equipped with the components (for example, the requesting unit, the information acquiring unit, and the communication control unit) of the information processing apparatus. In other words, the information processing apparatus may be mounted in the macro cell base station.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the information processing apparatus, the macro cell base station or the small cell base station) in the present specification function as the components (for example, an information acquiring unit or the communication control unit) of the above-described apparatuses (in other words, a computer program for making the processor execute operation of the components of the above-described apparatuses). Further, it is also possible to provide a storage medium having the above-described computer program stored therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit or the communication control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An apparatus, including:

an acquiring unit configured to acquire band-related information that is related to a frequency band available to a macro cell base station of a cellular system among shared bands shared between the cellular system and another system and is provided from a controller for a plurality of macro cell base stations of the cellular system; and a control unit configured to decide a frequency band available to a small cell base station corresponding to the macro cell base station among the frequency bands available to the macro cell base station.

(2)

The apparatus according to (1), wherein the frequency band available to the macro cell base station is a band decided based on a position of the macro cell base station.

(3)

The apparatus according to (1) or (2), wherein the control unit decides the frequency band available to the small cell base station based on a position of the small cell base station.

(4)

The apparatus according to any one of (1) to (3), wherein the band-related information includes information indicating a maximum transmission power when the macro cell base station uses the frequency band available to the macro cell base station, and the control unit decides the frequency band available to the small cell base station based on the maximum transmission power.

(5)

The apparatus according to any one of (1) to (4), wherein the control unit decides the frequency band available to the small cell base station based on a traffic volume in a small cell of the small cell base station.

(6)

The apparatus according to any one of (1) to (5), wherein the control unit decides the frequency band available to the small cell base station based on a priority of data that is transmitted or received by the small cell base station.

(7)

The apparatus according to any one of (1) to (6), wherein the control unit decides the frequency band available to the small cell base station based on communication quality in a small cell of the small cell base station.

(8)

The apparatus according to any one of (1) to (7), wherein the control unit decides a maximum transmission power when the small cell base station uses the frequency band available to the small cell base station.

(9)

The apparatus according to (8), wherein the band-related information includes information indicating a maximum transmission power when the macro cell base station uses the frequency band available to the macro cell base station, and the control unit decides the maximum transmission power when the small cell base station uses the frequency band available to the small cell base station based on the maximum transmission power when the macro cell base station uses the frequency band available to the macro cell base station.

(10)

The apparatus according to (8) or (9), wherein the control unit decides the maximum transmission power based on communication quality in a small cell of the small cell base station.

(11)

The apparatus according to any one of (1) to (10), wherein the control unit decides the frequency band available to the small cell base station according to a request from the small cell base station.

(12)

The apparatus according to any one of (1) to (11), wherein the control unit provides other band-related information related to the frequency band available to the small cell base station to the small cell base station.

(13)

The apparatus according to (12), wherein the other band-related information includes information indicating an available area of the frequency band available to the small cell base station.

(14)

The apparatus according to any one of (1) to (13), further including:

a requesting unit configured to request the controller to give permission for use of the shared band by the macro cell base station, wherein the band-related information is information provided from the controller according to the request for the permission.

(15)

The apparatus according to (14), wherein the requesting unit provides position information indicating a position of the macro cell base station to the controller.

(16)

The apparatus according to (14) or (15), wherein the requesting unit provides information indicating a traffic volume in a macro cell of the macro cell base station and a traffic volume in a small cell of the small cell base station to the controller.

(17)

The apparatus according to any one of (14) to (16), wherein the acquiring unit acquires the band-related information when the permission for the use of the shared band by the macro cell base station is given, and acquires prohibition period information that indicates a period in which the request for the permission is prohibited and is provided from the controller when the permission for the use of the shared band by the macro cell base station is not given.

(18)

The apparatus according to any one of (1) to (17),
wherein the band-related information includes information indicating an available period of the frequency band available to the macro cell base station.

(19)

An apparatus, including:
an acquiring unit configured to acquire band-related information that is related to a frequency band available to a macro cell base station of a cellular system among shared bands shared between wireless communication of the cellular system and other wireless communication and is provided from a controller for a plurality of macro cell base stations of the cellular system; and
a control unit configured to control multicasting or broadcasting of the band-related information by the macro cell base station.

(20)

An apparatus, including:
an acquiring unit configured to acquire band-related information that is related to a frequency band available to a macro cell base station of a cellular system among shared bands shared between wireless communication of the cellular system and other wireless communication and is provided from a controller for a plurality of macro cell base stations of the cellular system;
an estimating unit configured to estimate a frequency band available to a small cell base station corresponding to the macro cell base station among the frequency bands available to the macro cell base station; and
a requesting unit configured to request permission for use of the shared band by the small cell base station when there is the frequency band available to the small cell base station.

(21)

The apparatus according to any one of (1) to (18),
wherein the acquiring unit acquires the band-related information that is related to the frequency band available to the macro cell base station among the shared bands and is provided from the controller for each of two or more macro cell base stations of the cellular system, and
the control unit decides the frequency band available to the small cell base station corresponding to the macro cell base station for each of the two or more macro cell base stations.

(22)

The apparatus according to any one of (1) to (18) and (21), further including:
a processing resource control unit that increases or decreases processing resources for the control unit.

(23)

The apparatus according to (22),
wherein the control unit decides the frequency band available to the small cell base station for each of two or more small cell base stations, and
the processing resource control unit increases or decreases the processing resources for the control unit based on the number of small cell base stations in an operation state among the two or more small cell base stations.

(24)

The apparatus according to any one of (1) to (18) and (21) to (23),
wherein the apparatus is a core network node of the cellular system or a module of the core network node.

(25)

The apparatus according to any one of (1) to (18) and (21) to (24),
wherein the apparatus is the macro cell base station, a base station apparatus for the macro cell base station, or a module for the base station apparatus.

(26)

The apparatus according to any one of (1) to (18) and (21) to (25),
wherein the small cell base station includes a mobile apparatus that can operate as a base station.

(27)

The apparatus according to (19),
wherein the control unit controls the multicasting or the broadcasting such that the multicasting or the broadcasting is performed at transmission power corresponding to a maximum transmission power when the macro cell base station uses the frequency band available to the macro cell base station.

(28)

The apparatus according to (19) or (26),
wherein the apparatus is the macro cell base station.

(29)

The apparatus according to (20),
wherein the apparatus is the small cell base station.

(30)

A method, including:
acquiring band-related information that is related to a frequency band available to a macro cell base station of a cellular system among shared bands shared between the cellular system and another system and is provided from a controller for a plurality of macro cell base stations of the cellular system; and
deciding, with a processor, a frequency band available to a small cell base station corresponding to the macro cell base station among the frequency bands available to the macro cell base station.

(31)

A program causing a processor to execute:
acquiring band-related information that is related to a frequency band available to a macro cell base station of a cellular system among shared bands shared between the cellular system and another system and is provided from a controller for a plurality of macro cell base stations of the cellular system; and
deciding a frequency band available to a small cell base station corresponding to the macro cell base station among the frequency bands available to the macro cell base station.

(32)

A readable recording medium having a program recorded thereon, the program causing a processor to execute:
acquiring band-related information that is related to a frequency band available to a macro cell base station of a cellular system among shared bands shared between the cellular system and another system and is provided from a controller for a plurality of macro cell base stations of the cellular system; and
deciding a frequency band available to a small cell base station corresponding to the macro cell base station among the frequency bands available to the macro cell base station.

(33)

A method, including:
acquiring band-related information that is related to a frequency band available to a macro cell base station of a cellular system among shared bands shared between wireless communication of the cellular system and other wireless communication and is provided from a controller for a plurality of macro cell base stations of the cellular system; and controlling, with a processor, multicasting or broadcasting of the band-related information by the macro cell base station.

(34)

A program causing a processor to execute:

acquiring band-related information that is related to a frequency band available to a macro cell base station of a cellular system among shared bands shared between wireless communication of the cellular system and other wireless communication and is provided from a controller for a plurality of macro cell base stations of the cellular system; and controlling multicasting or broadcasting of the band-related information by the macro cell base station.

(35)

A readable recording medium having a program recorded thereon, the program causing a processor to execute:

acquiring band-related information that is related to a frequency band available to a macro cell base station of a cellular system among shared bands shared between wireless communication of the cellular system and other wireless communication and is provided from a controller for a plurality of macro cell base stations of the cellular system; and controlling multicasting or broadcasting of the band-related information by the macro cell base station.

(36)

A method, including:

acquiring band-related information that is related to a frequency band available to a macro cell base station of a cellular system among shared bands shared between wireless communication of the cellular system and other wireless communication and is provided from a controller for a plurality of macro cell base stations of the cellular system;

estimating, with a processor, a frequency band available to a small cell base station corresponding to the macro cell base station among the frequency bands available to the macro cell base station; and requesting, with a processor, permission for use of the shared band by the small cell base station when there is the frequency band available to the small cell base station.

(37)

A program causing a processor to execute:

acquiring band-related information that is related to a frequency band available to a macro cell base station of a cellular system among shared bands shared between wireless communication of the cellular system and other wireless communication and is provided from a controller for a plurality of macro cell base stations of the cellular system;

estimating a frequency band available to a small cell base station corresponding to the macro cell base station among the frequency bands available to the macro cell base station; and requesting permission for use of the shared band by the small cell base station when there is the frequency band available to the small cell base station.

(38)

A readable recording medium having a program recorded thereon, the program causing a processor to execute:

acquiring band-related information that is related to a frequency band available to a macro cell base station of a cellular system among shared bands shared between wireless communication of the cellular system and other wireless communication and is provided from a controller for a plurality of macro cell base stations of the cellular system;

estimating a frequency band available to a small cell base station corresponding to the macro cell base station among the frequency bands available to the macro cell base station; and requesting permission for use of the shared band by the small cell base station when there is the frequency band available to the small cell base station.

REFERENCE SIGNS LIST 1 communication system
20 macro cell
30 small cell
40 frequency management system
50 controller
70 router
100 information processing apparatus
131 requesting unit
133 information acquiring unit
135 communication control unit
137 processing resource control unit
200 macro cell base station
251 information acquiring unit
253 communication control unit
300 small cell base station
351 information acquiring unit
353 estimating unit
355 requesting unit
357 communication control unit

The invention claimed is:

1. An apparatus that serves as a node for a macro cell base station in a cellular system, the apparatus comprising:
   circuitry configured to
      request, to a controller via an information processing apparatus, permission for using a plurality of frequency bands;
      acquire, from the controller, band-related information that indicates the frequency bands available to the macro cell base station, the frequency bands being shared bands that are shared between the cellular system and another cellular system, and the controller managing the shared bands for a plurality of macro cell base stations of the cellular system;
      set a macro band, as a first frequency band from the frequency bands available to the macro cell, for use by the macro cell base station in response to acquiring the band-related information; and
      set a small band, as a second frequency band from the frequency bands available to the macro cell base station, for use by a small cell base station in response to acquiring small band information from the information processing apparatus, wherein
   the circuitry wirelessly broadcasts or multicasts the band-related information at a maximum transmission power according to an instruction from the information processing apparatus,
   the circuitry sets the small band based on a position of the macro cell base station and a position of the small cell base station, and
   the position of the small cell base station is closer to the macro base station than to remaining macro base stations of the plurality of macro base stations.

2. The apparatus according to claim 1, wherein
   the band-related information includes information indicating a maximum transmission power when the macro cell base station uses one of the frequency bands available to the macro cell base station, and the circuitry decides the small band based on the maximum transmission power.

3. The apparatus according to claim 1, wherein the circuitry decides the small band based on a traffic volume in a small cell of the small cell base station.

4. The apparatus according to claim 1, wherein the circuitry decides the small band based on a priority of data that is transmitted or received by the small cell base station.

5. The apparatus according to claim 1, wherein the circuitry decides the small band based on communication quality in a small cell of the small cell base station.

6. The apparatus according to claim 1, wherein the circuitry decides a maximum transmission power when the small cell base station uses the small band.

7. The apparatus according to claim 6, wherein the band-related information includes information indicating a maximum transmission power when the macro cell base station uses the macro band, and the circuitry decides the maximum transmission power when the small cell base station uses the small band based on the maximum transmission power when the macro cell base station uses the macro band.

8. The apparatus according to claim 6, wherein the circuitry decides the maximum transmission power based on communication quality in a small cell of the small cell base station.

9. The apparatus according to claim 1, wherein the circuitry decides the small band according to a request from the small cell base station.

10. The apparatus according to claim 1, wherein the circuitry provides other band-related information related to the small band to the small cell base station.

11. The apparatus according to claim 10, wherein the other band-related information includes information indicating an available area of the small band.

12. The apparatus according to claim 1, wherein the circuitry provides position information indicating the position of the macro cell base station to the controller.

13. The apparatus according to claim 1, wherein the circuitry provides information indicating a traffic volume in a macro cell of the macro cell base station and a traffic volume in a small cell of the small cell base station to the controller.

14. The apparatus according to claim 1, wherein the circuitry acquires the band-related information when the permission for the use of the shared band by the macro cell base station is given, and acquires prohibition period information that indicates a period in which the request for the permission is prohibited and is provided from the controller when the permission for the use of the shared band by the macro cell base station is not given.

15. The apparatus according to claim 1, wherein the band-related information includes information indicating an available period of the frequency band available to the macro cell base station.

* * * * *